(12) United States Patent
Spittle et al.

(10) Patent No.: US 11,242,624 B2
(45) Date of Patent: Feb. 8, 2022

(54) GROWING MEDIUM AND MULCH FIBER OPENING APPARATUS

(71) Applicant: PROFILE PRODUCTS L.L.C., Buffalo Grove, IL (US)

(72) Inventors: Kevin Scott Spittle, Vero Beach, FL (US); Gary Lane Bowers, Jonesborough, TN (US)

(73) Assignee: PROFILE PRODUCTS L.L.C., Buffalo Grove, IL (US)

( * ) Notice: Subject to any disclaimer, the term of this patent is extended or adjusted under 35 U.S.C. 154(b) by 0 days.

(21) Appl. No.: 15/322,921

(22) PCT Filed: Jun. 29, 2015

(86) PCT No.: PCT/US2015/038318
§ 371 (c)(1),
(2) Date: Dec. 29, 2016

(87) PCT Pub. No.: WO2016/003905
PCT Pub. Date: Jan. 7, 2016

(65) Prior Publication Data
US 2017/0137972 A1 May 18, 2017

Related U.S. Application Data

(60) Provisional application No. 62/018,639, filed on Jun. 29, 2014, provisional application No. 62/018,640, (Continued)

(51) Int. Cl.
*D01G 9/06* (2006.01)
*D01G 7/02* (2006.01)
*A01G 13/02* (2006.01)

(52) U.S. Cl.
CPC .......... *D01G 9/06* (2013.01); *A01G 13/0262* (2013.01)

(58) Field of Classification Search
CPC .. D01G 9/06; D01G 9/04; D01G 9/00; D01G 23/00; D01G 23/08; D01B 1/10; D01B 1/14; D01B 1/24
(Continued)

(56) References Cited

U.S. PATENT DOCUMENTS 441,760 A * 12/1890 Horrocks ................. D01G 9/04
19/86
524,650 A * 8/1894 Potter ....................... D01G 9/00
19/204
(Continued)

FOREIGN PATENT DOCUMENTS

| CN | 2223300 Y | 3/1996 |
| CN | 1191524 A | 8/1998 |

(Continued)

OTHER PUBLICATIONS

W.C. Fonteno et al., "Procedures for Determining Physical Properties of Horticultural Substrates Using The NCSU Promoter," North Carolina State University, NCSU Porometer Manual, 27 pages.
(Continued)

*Primary Examiner* — Shaun R Hurley
*Assistant Examiner* — Bao-Thieu L Nguyen
(74) *Attorney, Agent, or Firm* — Brooks Kushman P.C.

(57) ABSTRACT

A compressed growing medium or mulch fiber opener comprising at least one set of adjacent rotating members, the rotating members having a surface and including at least one wire wound around at least a portion of the surface, wherein the wire includes a plurality of projections engaging compressed or partially opened growing medium or mulch fiber, and wherein a distance between the adjacent rotating members is sufficiently small to create at least one pinch point between the adjacent rotating members, the adjacent rotating
(Continued)

members separating the fibers as the fibers pass through the at least one pinch point so that the density of the fiber is lowered by at least 50-95%.

20 Claims, 9 Drawing Sheets

Related U.S. Application Data filed on Jun. 29, 2014, provisional application No. 62/056,798, filed on Sep. 29, 2014, provisional application No. 62/123,782, filed on Nov. 26, 2014, provisional application No. 62/181,456, filed on Jun. 18, 2015.

(58) Field of Classification Search
USPC .................................................. 19/80 R, 105
See application file for complete search history.

(56) References Cited

U.S. PATENT DOCUMENTS

| | | | | |
|---|---|---|---|---|
| 524,695 A * | 8/1894 | Potter | ............... | D01G 9/00 19/94 |
| 1,015,764 A * | 1/1912 | Potter | ............... | D01G 9/00 19/204 |
| 1,222,523 A * | 4/1917 | Cary | ............... | D01B 1/08 19/37 |
| 1,331,001 A * | 2/1920 | Conrad | ............... | D01B 1/04 19/37 |
| 1,610,096 A * | 12/1926 | Jolly | ............... | D01G 9/06 19/81 |
| 1,610,791 A * | 12/1926 | Jolly | ............... | D01G 9/06 19/65 A |
| 1,629,068 A * | 5/1927 | Cook | ............... | D01G 9/00 19/65 A |
| 1,700,321 A * | 1/1929 | Lauterbur | ............... | A21C 1/06 366/97 |
| 1,700,621 A | 1/1929 | Allen | | |
| 2,100,300 A | 11/1937 | Mitchell | | |
| 2,157,684 A * | 5/1939 | Williams | ............... | D01G 9/00 19/89 |
| 2,744,045 A | 5/1956 | Collins | | |
| 2,757,150 A | 7/1956 | Heritage | | |
| 2,759,224 A | 8/1956 | Simons | | |
| 2,795,080 A | 6/1957 | Williams | | |
| 2,893,064 A * | 7/1959 | Rusca | ............... | D01G 9/06 209/135 |
| 2,902,722 A | 9/1959 | Wallace | | |
| 2,986,778 A | 6/1961 | Goodwin et al. | | |
| 2,989,252 A * | 6/1961 | Babb | ............... | B02C 13/00 19/80 R |
| 2,995,434 A | 8/1961 | Burton | | |
| 3,051,398 A * | 8/1962 | Babb | ............... | B02C 13/06 19/80 R |
| 3,139,650 A * | 7/1964 | Diesel | ............... | D01G 7/04 19/145.5 |
| 3,150,215 A | 9/1964 | Houghton | | |
| 3,192,571 A * | 7/1965 | Halleux | ............... | D01G 23/06 19/65 R |
| 3,208,107 A * | 9/1965 | Kotter | ............... | D01G 13/00 19/145.5 |
| 3,251,096 A * | 5/1966 | Rapp | ............... | D01G 7/00 19/80 R |
| 3,797,073 A | 3/1974 | Fairfield | | |
| 3,862,472 A | 1/1975 | Norton et al. | | |
| 4,031,003 A | 6/1977 | Husky | | |
| 4,057,876 A * | 11/1977 | Sawyer | ............... | D01G 7/08 19/80 R |
| 4,097,209 A | 6/1978 | Garrick et al. | | |
| 4,109,875 A * | 8/1978 | Condarco | ............... | A01F 29/00 19/80 R |
| 4,192,042 A * | 3/1980 | Jagst | ............... | D01G 7/04 19/145.5 |
| 4,202,079 A * | 5/1980 | Prather | ............... | D01G 7/00 19/64.5 |
| 4,237,814 A | 12/1980 | Ormos et al. | | |
| 4,274,177 A | 6/1981 | Grimshaw et al. | | |
| 4,300,267 A * | 11/1981 | Winch | ............... | D01G 9/00 19/107 |
| 4,435,353 A | 3/1984 | Forry et al. | | |
| 4,458,381 A * | 7/1984 | Van Doorn | ............... | D01G 9/06 19/200 |
| 4,479,285 A * | 10/1984 | Ragan | ............... | D01G 31/00 19/64.5 |
| 4,548,131 A * | 10/1985 | Williams | ............... | A01D 43/00 100/1 |
| 4,625,368 A * | 12/1986 | Leifeld | ............... | D01G 9/04 19/200 |
| 4,662,031 A * | 5/1987 | Feiks | ............... | D01G 7/04 19/80 R |
| 4,723,343 A * | 2/1988 | Bernhardt | ............... | D01G 15/02 19/105 |
| 4,756,059 A * | 7/1988 | Temburg | ............... | D01G 7/04 19/80 R |
| 4,766,648 A * | 8/1988 | Kerley | ............... | D01B 1/04 19/80 R |
| 4,788,790 A | 12/1988 | Zeager | | |
| 4,796,335 A * | 1/1989 | Kranefeld | ............... | D01G 7/04 19/80 R |
| 4,932,156 A | 6/1990 | Underwood | | |
| 4,971,540 A | 11/1990 | Barnes | | |
| 4,987,646 A | 1/1991 | Leifeld et al. | | |
| 4,993,119 A * | 2/1991 | Roberson | ............... | D01G 7/08 19/105 |
| 5,087,400 A | 2/1992 | Theuveny | | |
| 5,121,841 A * | 6/1992 | Harrington | ............... | D01G 7/10 19/80 R |
| 5,192,587 A | 3/1993 | Rondy | | |
| 5,343,597 A * | 9/1994 | Pinto | ............... | D01G 9/08 19/200 |
| 5,513,805 A | 5/1996 | Fisher et al. | | |
| 5,537,809 A * | 7/1996 | Blalock | ............... | D01G 7/02 19/80 R |
| 5,617,614 A * | 4/1997 | Locatelli | ............... | D01G 7/04 19/80 R |
| 5,845,367 A * | 12/1998 | Vezzoli | ............... | D01G 9/06 19/85 |
| 6,195,841 B1 * | 3/2001 | Mascheretti | ............... | D01G 9/06 19/105 |
| 6,327,745 B1 * | 12/2001 | Franke | ............... | D01G 9/10 19/200 |
| 6,349,499 B1 | 2/2002 | Spittle | | |
| 6,393,665 B1 * | 5/2002 | Foster | ............... | D01G 7/04 19/145.5 |
| 6,435,433 B1 | 8/2002 | Hesch | | |
| 6,442,803 B1 * | 9/2002 | Foster | ............... | D01G 13/00 19/145.5 |
| 6,460,223 B1 | 10/2002 | Pinto | | |
| 6,539,585 B1 * | 4/2003 | Anthony | ............... | D01B 1/04 19/39 |
| 6,615,454 B1 * | 9/2003 | Anthony | ............... | D01G 9/06 19/200 |
| 6,711,850 B2 | 3/2004 | Yelanich et al. | | |
| 6,740,342 B1 | 5/2004 | Hulst et al. | | |
| 6,773,545 B2 | 8/2004 | Tanner et al. | | |
| 6,786,438 B2 * | 9/2004 | Winn | ............... | D01G 9/04 19/48 R |
| 6,800,319 B1 | 10/2004 | Hulst et al. | | |
| 7,032,273 B2 * | 4/2006 | Pinto | ............... | D01G 9/04 19/145.5 |
| 7,752,715 B2 * | 7/2010 | Morgner | ............... | D01G 9/06 19/105 |
| 7,797,798 B2 | 9/2010 | Rosemann | | |
| 8,567,117 B2 | 10/2013 | Spittle | | |
| 8,894,811 B1 | 11/2014 | Brown | | |
| 8,984,805 B2 | 3/2015 | Shpak et al. | | |
| 10,266,457 B2 | 4/2019 | Spittle et al. | | |
| 10,519,073 B2 | 12/2019 | Spittle et al. | | |
| 10,907,098 B2 | 2/2021 | Spittle et al. | | |
| 2002/0026688 A1 | 3/2002 | Rubenach | | |

(56) References Cited

U.S. PATENT DOCUMENTS

| | | | |
|---|---|---|---|
| 2002/0189053 A1* | 12/2002 | Pasini | D01G 9/06 |
| | | | 19/200 |
| 2003/0056873 A1 | 3/2003 | Nakos et al. | |
| 2005/0076564 A1 | 4/2005 | Castleberry | |
| 2006/0207064 A1* | 9/2006 | Minter | D01G 7/06 |
| | | | 19/80 R |
| 2007/0186463 A1 | 8/2007 | Lougheed | |
| 2008/0280760 A1 | 11/2008 | Oliver | |
| 2009/0101294 A1* | 4/2009 | Young | D01B 1/10 |
| | | | 162/20 |
| 2010/0155513 A1* | 6/2010 | Brick | A01F 29/005 |
| | | | 241/30 |
| 2012/0255143 A1* | 10/2012 | Iten | D01G 15/88 |
| | | | 19/106 R |
| 2013/0075504 A1 | 3/2013 | Beaudet et al. | |
| 2013/0075509 A1 | 3/2013 | Beaudet et al. | |
| 2013/0255048 A1 | 10/2013 | Crary et al. | |
| 2015/0225304 A1 | 8/2015 | Donze et al. | |
| 2015/0368165 A1 | 12/2015 | Tournayre et al. | |
| 2016/0083651 A1 | 3/2016 | Phillips et al. | |
| 2016/0138201 A1* | 5/2016 | Bocht | D01G 15/88 |
| | | | 19/114 |
| 2017/0305802 A1 | 10/2017 | Tournayre et al. | |
| 2018/0057966 A1* | 3/2018 | Spittle | D01G 9/06 |
| 2021/0047566 A1 | 2/2021 | Spittle et al. | |

FOREIGN PATENT DOCUMENTS

| | | |
|---|---|---|
| CN | 1607999 A | 4/2005 |
| CN | 1612686 A | 5/2005 |
| CN | 101096786 A | 1/2008 |
| CN | 101219916 A | 7/2008 |
| CN | 201495328 U | 6/2010 |
| CN | 201947750 U | 8/2011 |
| CN | 202543422 U | 11/2012 |
| CN | 202730348 U | 2/2013 |
| DE | 24 32 432 | 1/1975 |
| DE | 32 35 452 A1 | 3/1984 |
| DE | 4243126 A1 | 6/1994 |
| DE | 10360635 A1 | 7/2005 |
| EP | 0147349 A1 | 7/1985 |
| EP | 0167340 A2 | 1/1986 |
| EP | 1491666 A1 | 12/2004 |
| EP | 1914344 A1 | 4/2008 |
| FR | 2705191 A1 | 11/1994 |
| GB | 437242 | 10/1935 |
| GB | 1 337 694 | 11/1973 |
| JP | 61186524 A | 8/1986 |
| JP | 2006214053 A | 8/2006 |
| KR | 19810001716 B1 | 11/1981 |
| WO | 9853669 A1 | 12/1998 |
| WO | 2006/055715 A2 | 5/2006 |

OTHER PUBLICATIONS

Related U.S. Appl. No. 15/322,906, filed Dec. 29, 2016. 23 pages (WO2016/003901) "Bark and Wood Fiber Growing Medium".
Related U.S. Appl. No. 15/322,899, filed Dec. 29, 2016. 24 pages (WO2016/003903) "Naturally Dyed Mulch and Growing Media".
IPR & International Search Report, dated Sep. 30, 2015, PCT/US15/38318, 11 pages.
IPR & International Search Report, PCT/US2015/038315, dated Jun. 29, 2015, 16 pages.
IPR & International Search Report, PCT/US2015/038312, dated Jun. 29, 2015, 10 pages.
IPR & Search Report PCT/US18/12649, dated May 7, 2018, (13 pages).
EP Search Report, Application No. EP 15 81 5634.9 (PCT/US2015/038318, dated May 14, 2018 (4 pages).
Maatjie, Ma, "Growth, Yield and quality of Hydroponically Grown Tomatoes as Affected by Different Particle Sizes of Sawdust", 2015. University of South Africa dissertation; figure 4-6; pp. 13, 30.
Office ACTION, related U.S. Appl. No. 15/322,906; dated Jul. 2, 2018.
Notice of Allowance, related U.S. Appl. No. 15/400,363; dated Jan. 17, 2019.
Chinese 1st Office Action, Application Serial No. 201580036062.0, dated Jan. 18, 2019.
Office Action, related U.S. Appl. No. 15/400,363; dated Sep. 13, 2018.
Chinese Office Action dated Nov. 2, 2018, Application No. 201580035717.2.
European Office Action dated Jun. 13, 2018, Application No. 15815634.9.
Australian Office Action dated May 9, 2018, Application No. 2015284367.
Final Office Action, related U.S. Appl. No. 15/322,906; dated Jan. 30, 2019.
Notice of Allowance dated May 16, 2019, related U.S. Appl. No. 15/322,906, filed Dec. 29, 2016.
Search Report & Written Opinion of related application No. PCT/US18/57234, dated Jan. 7, 2019.
Chinese Office Action, Application No. 201580035717.2, dated Apr. 22, 2019, 9 pages. (No. translation available).
Office Action, related U.S. Appl. No. 16/366,319, dated May 2, 2019.
Australian Examination Report No. 2, Application No. 2015284367, dated Feb. 26, 2019, 4 pages.
Australian Office Action dated Feb. 22, 2019, Application No. 2015284371.
Office Action dated Jul. 18, 2019 issued in connection with related U.S. Appl. No. 15/792,100.
Office Action dated Sep. 10, 2019 issued in connection with related U.S. Appl. No. 15/322,921.
Notice of Allowance dated Sep. 27, 2019 issued in connection with related U.S. Appl. No. 16/366,319.
CN Office Action dated Feb. 3, 2020, which issued in connection with related CN application Serial No. 2015800357172.
Office Action dated Dec. 20, 2019, which issued in connection with related U.S. Appl. No. 16/589,694.
Office Action dated Feb. 18, 2020, which issued in connection with related U.S. Appl. No. 15/792,100.
Chinese 2nd Office Action, Application No. 201580036062.0, dated Sep. 25, 2019.
Office Action dated Sep. 17, 2019 issued in connection with related U.S. Appl. No. 15/322,899.
Canadian Office Action Report, dated Sep. 21, 2020, for related CA Application No. 2,953,792, 4 pages.
First Australian Office Action dated Feb. 3, 2021 for AU Application No. 2020201215, received in a related application.
3rd Chinese Office Action for CN 201580036062.0, dated Jun. 28, 2020 and English Translation.
European Office Action Report, dated Sep. 11, 2020, for EP Application No. 15 815 443.5, 7 pages.
4th Chinese Office Action, dated Oct. 13, 2020 for Chinese Application No. CN201580035717.2. English Translation Provided.
Foreign Textile Technology, vol. 3, Mar. 31, 1975, Shanghai Institute of Textile Technology, Shaghai Institute of Science and Technology Information, "Improvement of card clothing on carding machine," http://img.duxiu.com/n/print.jsp, retrieved Sep. 21, 2020, 3 pages. English Translation Provided (5 pages).
Basic Theory of Carding, Apr. 30, 2012, Zhang Wengeng et al., Donghua University Press, "6.3 Card Clothing," http://img.duxiu.com/n/print.jsp, retrieved Sep. 21, 2020, ISBN978-7-5669-0034-0/TS 316, 2 pages. English Translation Provided (1 page).
Non-Final Office Action dated Feb. 24, 2021 for U.S. Appl. No. 15/792,100, received in a related application.
Notice of Allowance for U.S. Appl. No. 16/589,694, dated Jul. 17, 2020, that issued in connection with a related application is enclosed.
Non-Final Office Action for U.S. Appl. No. 15/322,899, dated Apr. 10, 2020 that issued in connection with a related application is enclosed.
Notice of Allowance dated Aug. 6, 2020 received in related U.S. Appl. No. 15/322,899.

(56) References Cited

OTHER PUBLICATIONS

3rd Party Submission Notice dated Jun. 23, 2021 submitted by Tony Jennings in connection with related Australian Patent Application No. 2020267281. 14 pages.

YouTube video clip entitled "High-Quality Substrates for Professional Horticulture," https://youtu.be/UcDo5fS8Awo, Pindstrup Production Video, uploaded on Nov. 28, 2019, 35 pages.

Pindstrup, "Projects", https://www.pindstrup.com/about/projects, Sep. 15, 2015, 4 pages.

Canadian Office Action dated Jul. 9, 2021 for CA Application No. 2,953,717, received in a related application.

Chinese Office Action dated Feb. 19, 2021 for CN Application No. 201580036062.0, received in a related application.

European Office Action dated Mar. 22, 2021 for EP Application No. EP 501B0002EP, received in a related application.

Chinese Office Action dated Mar. 29, 2021 for CN Application No. 201580035717.2, received in a related application. An English Translation is provided.

Final Office Action dated Aug. 30, 2021 for U.S. Appl. No. 15/792,100, received in a related application.

European Office Action dated May 18, 2021 for EP Application No. 15815634.9, received in a related application.

Fifth Chinese Office Action dated Jul. 30, 2021 for Chinese Application No. CN 2015800357172, received in a related application. English Translation of Chinese OA provided.

Canadian Office Action dated Aug. 25, 2021 for Canadian Application No. CA 2,953,521, received in a related application.

Korean Office Action dated Sep. 29, 2021 for KR Application No. 10-2017-7002508 issued in a related application. English Translation included.

Non-Final Office Action dated Oct. 14, 2021 received in related U.S. Appl. No. 17/071,602.

Australian Examination Report No. 1 dated Nov. 26, 2021 that issued in connection with related Australian Patent Application No. 2020267281.

* cited by examiner

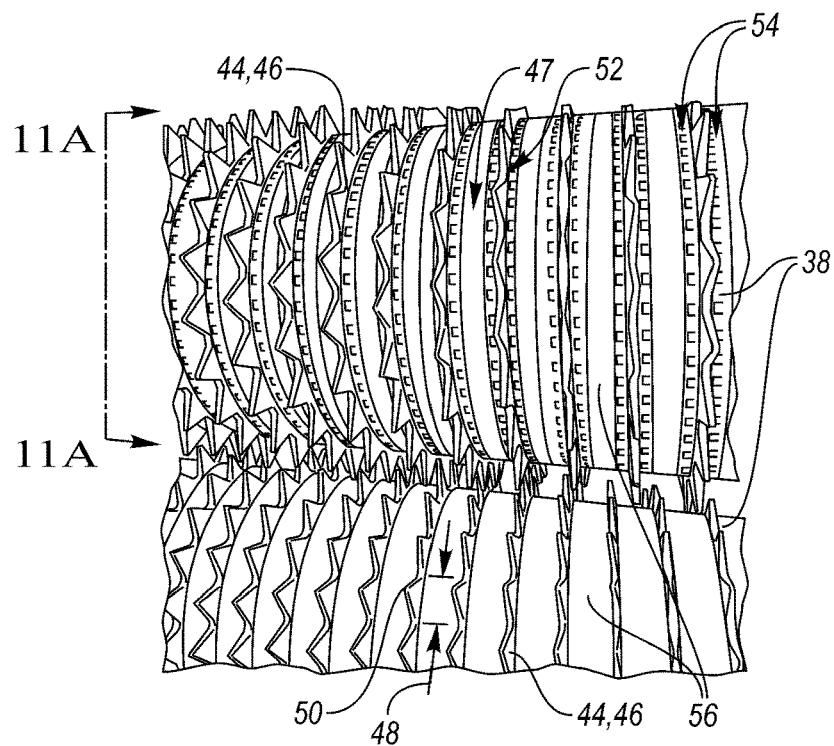
FIG. 10
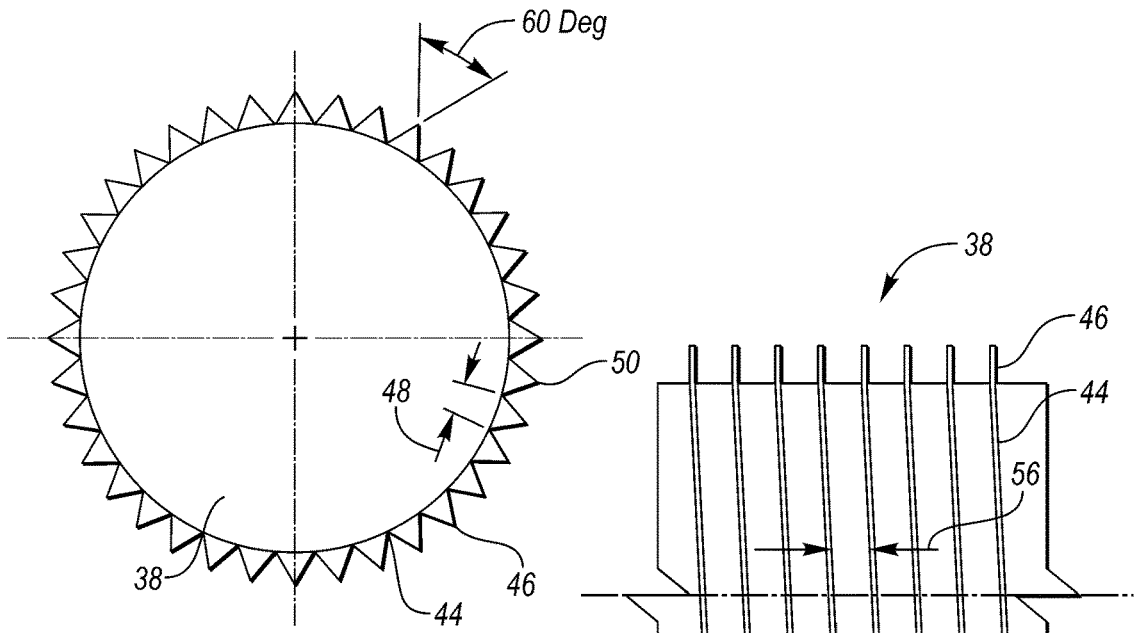
FIG. 11A
FIG. 11B

GROWING MEDIUM AND MULCH FIBER OPENING APPARATUS

CROSS-REFERENCE TO RELATED APPLICATION

This application is the U.S. National Phase of PCT Appln. No. PCT/US2015/038318 filed Jun. 29, 2015, which claims priority to U.S. provisional Applications Nos. 62/018,639 and 62/018,640 filed Jun. 29, 2014; U.S. provisional Application No. 62/056,798 filed Sep. 29, 2014; U.S. provisional Application No. 62/123,782 filed Nov. 26, 2014, and U.S. provisional Application No. 62/181,456 filed Jun. 18, 2015, the disclosures of which are incorporated in their entirety by reference herein.

TECHNICAL FIELD

The invention is directed to a fiber opening apparatus lowering density of highly compressed wood and/or bark fiber, a method of using the same, and mulch or a growing medium including fiber opened by the fiber opening apparatus.

BACKGROUND

Fiber opening systems have traditionally been designed for and have been used in the textile industry. Exemplary fiber openers are disclosed for example in the U.S. Patent Applications 2013/0075504 and US 2013/0075509, the disclosures of which are hereby incorporated by reference. A standard textile bale opener such as a 2+2 bale breaker with a lift apron features a vertically inclined belt with wooden strips which have sharp needles for opening of the fiber. The inclined belt lifts the fiber to a stripper belt which controls flow of the fiber and removes oversized pieces of the fiber. An adjustable gap exists between the stripper belt and the inclined belt. The wider the gap, the less fiber opening results. On the other hand, tightening the gap results in greater fiber opening, but the volume of input fiber can be restricted. The 2+2 bale breaker and other conventional textile bale breakers are designed to open textile fiber and thus are not capable of opening wood and/or bark fiber to sufficiently lower density of such fiber, especially in higher volumes of input fiber.

Wood and/or bark fiber is useful, for example, in preparation of growing media, mulches, and hydraulically-applied growing media and mulches. Since growing media and mulches are sold based on volume, the lower the weight of the growing media, the greater the value of the growing media and their components. Thus, it is desirable to lower density of the components of the growing media, especially the density of a highly compressed wood and/or bark fiber.

Therefore, it would be desirable to provide a fiber opening apparatus which is capable of lowering density of wood and/or bark fiber which is highly compressed, i.e. having a compressed density of about 10 to about 30 lbs/ft$^3$ (about 160.2 kg/m$^3$ to about 480.6 kg/m$^3$), by at least 85%, more preferably by at least 90%, even more preferably by at least 95%. It would be further desirable that such fiber opening apparatus is capable of handling large volumes of input fiber.

SUMMARY

It has now been surprisingly and unexpectedly discovered that a fiber opening apparatus employing a plurality of rotating members including a wire wound around the rotating members, the wire including projections, wherein the rotating members are engaging fiber and tearing the fiber apart, is capable of lowering the fiber density by at least 85%, thus providing higher volume of the fiber which results in increased value of the fiber as well as of a product including the fiber as a component such as a growing medium or a mulch.

BRIEF DESCRIPTION OF THE DRAWINGS

FIG. 10 shows a detailed view of two rotating members of FIG. 8.

FIG. 11A shows a cross-sectional view of a rotating member depicted in FIG. 10.

FIG. 11B depicts a schematic view of a section of a rotating member depicted in FIG. 10 having rows of wound wire on its surface.

DETAILED DESCRIPTION

Figure 1A:
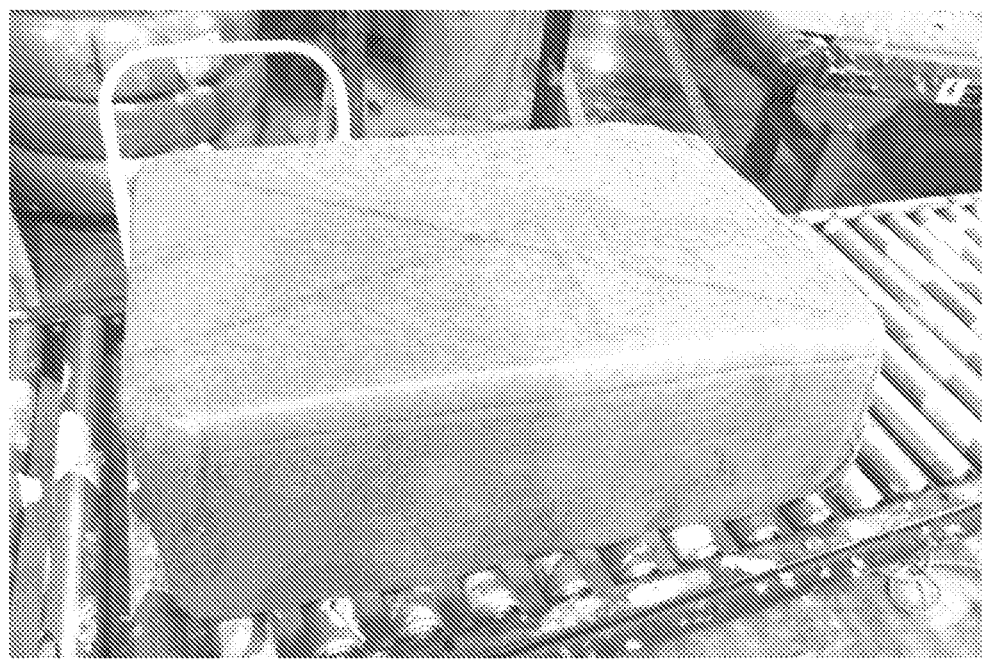
FIGS. 1A and 1B are photographic images of exemplary bales of compressed fiber.

The fiber opening apparatus of the invention may be used to lower the density of highly compressed fiber to increase its value as a component of a growing medium or mulch. By lowering density of the fiber, the density of the growing medium or mulch is lowered as well, and the value of the growing medium or mulch increases. Preferably, the input fiber is wood and/or bark fiber. The typical compressed density of the input fiber preferably varies between about 10 to about 30 lbs/ft$^3$ (about 160.2 kg/m$^3$ to about 480.5 kg/m$^3$). The density of the input fiber may be lowered by at least 85%, relative to the density of the input fiber.

The fiber opening apparatus is capable of lowering the density of the highly compressed wood and/or bark fiber, in the order of increasing preference, by about 50% or more, 60% or more, 70% or more, 80% or more, or 90% or more. The fiber opening apparatus is capable of lowering the density of the highly compressed wood and/or bark fiber by at least at least about 50 to 99%, 70 to 95%, or 85 to 90%. Table 1 provides a comparison of density reduction per ft$^3$ and m³ achieved by a conventional bale breaker and fiber opener, specifically the 2+2 bale breaker with a lift apron, and by the fiber opening apparatus of the disclosure. As Table 1 illustrates, the fiber opening apparatus of the disclosure achieves significantly higher fiber density reduction.

TABLE 1

Comparison of density reduction in a conventional apparatus versus the fiber opening apparatus of the disclosure having wire rotating members

| Organic Fiber Material | Density Achieved by 2 + 2 Bale Breaker with Lift Apron | | Density Achieved by Apparatus with Wire Rotating Members | |
|---|---|---|---|---|
| | lb/ft³ | kg/m³ | lb/ft³ | kg/m³ |
| Coarse Wood Fiber* | 1.84 | 29.5 | 1.39 | 22.3 |
| 80% Wood Fiber/ 20% Bark Fiber* | 2.32 | 37.2 | 1.60 | 25.6 |
| 70% Wood Fiber/ 30% Bark Fiber* | 2.36 | 37.8 | 1.59 | 25.5 |
| 50% Wood Fiber/ 50% Bark Fiber* | 2.80 | 44.9 | 2.11 | 33.8 |
| 30% Wood Fiber/ 70% Bark Fiber* | 4.40 | 70.48 | 3.21 | 51.4 |

*Wood and Bark - Pine Species

The fiber opening apparatus with wire rotating members may lower the density of the highly compressed fiber from about 10-30 lbs/ft³ (160.2-480.5 kg/m³) to about 0.8-2 lbs/ft³ (12.8-32 kg/m3) or 0.9-1.6 lbs/ft³ (14.4-25.6 kg/m³), depending on the type of fiber which is being opened by the apparatus. Table 2 provides a comparison of compressed bale density with the density of opened fiber for wood and/or bark fiber after passing through the fiber opening apparatus of the invention. As can be seen, the reduction for several materials is greater than 90%.

TABLE 2

Density reduction efficiency of the fiber opening apparatus of the invention having wire rotating members

| Organic Fiber Material | Density Compressed Bale | | Density Apparatus with Wire Rotating Members | | Density Reduction Efficiency |
|---|---|---|---|---|---|
| | lb/ft³ | kg/m³ | lb/ft³ | kg/m³ | (%) |
| Course Wood Fiber* | 20.0 | 320.4 | 1.39 | 22.3 | 93.0 |
| 80% Wood Fiber/ 20% Bark Fiber* | 20.0 | 320.4 | 1.60 | 25.6 | 92.0 |
| 70% Wood Fiber/ 30% Bark Fiber* | 20.0 | 320.4 | 1.59 | 25.5 | 92.0 |
| 50% Wood Fiber/ 50% Bark Fiber* | 20.0 | 320.4 | 2.11 | 33.8 | 89.4 |
| 30% Wood Fiber/ 70% Bark Fiber* | 20.0 | 320.4 | 3.21 | 51.4 | 83.9 |

*Wood and Bark - Pine Species

While reducing the fiber density, the fiber opening apparatus is expanding the volume of the wood and/or bark and/or peat fiber. For example, while conventional apparatus may expand a compressed bale of sphagnum peat in a ratio of 1:3.5 of unexpanded to expanded fiber, the fiber opening apparatus of the present disclosure is capable of expanding the highly compressed sphagnum peat in a ratio of 1:5 of unexpanded to expanded fiber. Other highly compressed fiber may be expanded in a ratio of at least 1:5.5, 1:7.5, 1:10, or even a better ratio of unexpanded to expanded fiber such as 1:12.5 may be achieved. For example, highly compressed wood and bark fiber may be expanded in a ratio of at least 1:11.5 and 100% wood fiber may be expanded in a ratio of at least 1:15 of unexpanded to expanded fiber.

Figure 1B:
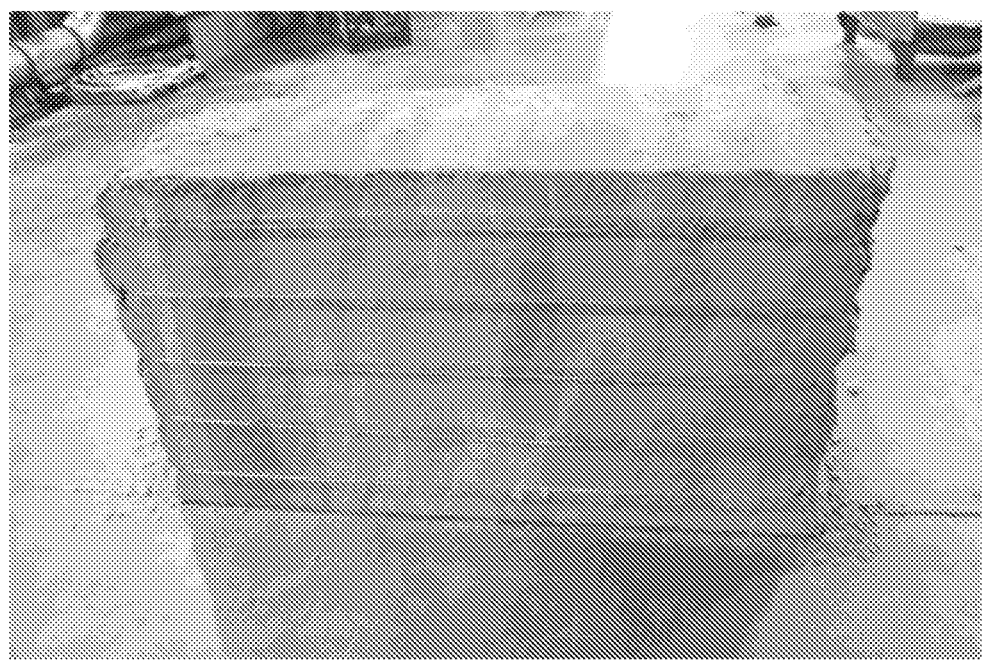

The fiber opening apparatus may receive input fiber from bales of compressed wood and/or bark fiber or other compressed fiber such as, but not limited to, sphagnum peat. The input fiber may originate from a vertical or a horizontal compressed bale. An exemplary compressed bale may have a density of about 20 lbs/ft³ (about 320.4 kg/m³), another exemplary bale may have a density of about 18.5 lbs/ft³ (about 296.3 kg/m³), but other densities are contemplated, typically falling between a range of about 10 to about 30 lbs/ft³ (about 160.2 kg/m³ to about 480.5 kg/m³). Compressed bales with densities below 10 lbs/ft³ (about 160.2 kg/m³) and bales with densities above 30 lbs/ft³ (about 480.5 kg/m³) are also contemplated. The input fiber may comprise wood fiber, bark fiber, or both. The input fiber may be extracted from hardwood (deciduous) tress and/or softwood (coniferous) trees. The wood and/or bark fiber may include, but is not limited to, wood and/or bark from pine, oak, walnut (*Juglans cinerea*), mahogany (*Swietenia macrophylla, Swietenia mahagoni, Swietenia humilis*), hemlock, Douglas fir, Colorado fir, alder, elm, birch, Sitka spruce, eucalyptus, sycamore, maple, cedar, sweetgum, crab apple, ash, weeping willow, sassafras, mulberry, the like, and combinations thereof. Examples of wood and/or bark fiber bales 1 may be seen in FIGS. 1A and 1B as well as in FIG. 4.

It is contemplated that the input fiber may originate from other sources such as cotton, wool, flax, jute, coconut, hemp, straw, grass, and other fibers available directly from natural sources such as peat, as well as chemically modified natural fibers, for example chemically modified cellulose fibers, cotton fibers, azlon, regenerated cellulose products including cellulose xanthate (rayon), cellulose acetate, cellulose triacetate, cellulose nitrate, alginate fibers, casein-based fibers; abaca, cantala, caroa, henequen, istle, Mauritius, phormium, bowstring, sisal, kenaf, ramie, roselle, sunn, cadillo, kapok, broom root, coir, crin vegetal, and piassaua. This list of fibers is illustrative and not limiting.

The wood and/or bark fiber bale may include about 5 to about 30 weight % of the tree bark and about 95 to about 70 weight % of the wood components, based on the total weight of the bale. Alternatively, the wood and/or bark fiber bale may include about 5 to about 20 weight % of the tree bark and about 95 to about 80 weight % of the wood components or about 5 to about 15 weight of the tree bark and about 95 to about 85 weight % of the wood components, based on the total weight of the bale.

The bale of fiber may further include about 0 to about 15 weight % of additional components that are combined with the wood and/or bark fiber, based on the total weight of the bale. Examples of such additional components include but are not limited to fertilizers, macronutrients, micronutrients, minerals, chemical binders, natural gums, interlocking man-made fibers, and the like, and combinations thereof. In general, these components are present in an amount of less than about 15 weight % of the total weight of the wood and/or bark fiber bale. The additional components in total may be present in an amount from about 1 to about 10% of the total weight of the fiber. Additionally, soil may be added in an amount of about 20% or less, about 15% or less, or about 5% or less of the total weight of the growing medium. The soil may be present in an amount of about 0.1 to about 20 weight % of the total weight of the growing medium. Soil may also be absent from the growing medium.

Fertilizers such as nitrogen fertilizers, phosphate fertilizers, potassium fertilizers, compound fertilizers, and the like may be used in a form of granules, powder, prills, or the like. For example, melamine/formaldehyde, urea/formaldehyde, urea/melamine/formaldehyde and like condensates may serve as a slow-release nitrogenous fertilizer. Fertilizers having lesser nutritional value, but providing other advantages such as improving aeration, water absorption, or being environmental-friendly may be used. The source of such fertilizers may be, for example, animal waste or plant waste.

Nutrients are well-known and may include, for example, macronutrients, micronutrients, and minerals. Examples of macronutrients include chloride, magnesium, phosphorus, potassium, and sodium. Micronutrients are also well-known and include, for example, boron, cobalt, chromium, calcium, copper, fluoride, iodine, iron, magnesium, manganese, molybdenum, selenium, zinc, vitamins, organic acids, and phytochemicals.

The binders may be natural or synthetic. For example, the synthetic binders may include a variety of polymers such as addition polymers produced by emulsion polymerization and used in the form of aqueous dispersions or as spray dried powders. Examples include styrene-butadiene polymers, styrene-acrylate polymers, polyvinylacetate polymers, polyvinylacetate-ethylene (EVA) polymers, polyvinylalcohol polymers, polyacrylate polymers, polyacrylic acid polymers, polyacrylamide polymers and their anionic- and cationic-modified copolymers, i.e., polyacrylamide-acrylic acid copolymers, and the like. Powdered polyethylene and polypropylene may also be used. When used, synthetic binders are preferably used in aqueous form, for example as solutions, emulsions, or dispersions. While binders are not ordinarily used in growing media, they may be useful in hydraulically applied mulches and hydraulically applied growing media.

Thermoset binders may also be used, including a wide variety of resole and novolac-type resins which are phenol/formaldehyde condensates, melamine/formaldehyde condensates, urea/formaldehyde condensates, and the like. Most of these are supplied in the form of aqueous solutions, emulsions, or dispersions, and are generally commercially available.

The natural binder may include a variety of starches such as corn starch, modified celluloses such as hydroxyalkyl celluloses and carboxyalkyl cellulose, or naturally occurring gums such as guar gum, gum tragacanth, and the like. Natural and synthetic waxes may also be used.

A fiber bale may include about 1 to about 50% of tree bark mixed with about 99 to about 50 weight % of wood components, based on the total weight of the bale. The term "wood components" refers to wood chips, wood fiber, or their combination. The wood components may be derived from coniferous and deciduous trees and may be prepared by any convenient manner, for example as disclosed in U.S. Pat. No. 2,757,150, the entire disclosure of which is hereby incorporated by reference. Any type of wood chip may be used, but wood chips of the softwood varieties such as yellow poplar, cedar such as Western red cedar, fir such as Douglas fir, California redwood, and particularly, pine such as Ponderosa, Sugar, White, and Yellow varieties of pine are preferred. Typically, the wood components are lighter in color than the tree bark before processing. The wood components may be dyed by one or more pigments and/or pigment precursors of a tree bark when the wood components are being formed into fibers through a refiner such that the growing medium or mulch has a natural brown coloring for visual monitoring.

The term "mulch" as used herein means a layer of fibrous material that is applied to a soil to reduce erosion, to improve water retention, and/or to hold a seed in place on the soil surface long enough for the seed to germinate and for the root to develop within the soil below the mulch. Hydraulic mulches are mulches applied by spraying with water through a hydraulic seeder or similar device.

The term "growing medium" refers to a soil-free substrate or a substrate with soil, or a combination of materials used to provide physical support, water retention, aeration, and/or nutrient supply for plant growth so that a plant can establish its root system within the growing medium and allow for root growth, as the roots grow in spaces between individual particles of the growing medium.

The bark may contain one or more natural pigments or pigment precursors that give color to its layers. Some bark, (for example eucalyptus bark and sycamore bark) may be light-colored initially, but darken after its pigments are oxidized. Pigments included in the bark may include, but are not limited, to tannins such as tannic acid (e.g., quercitannic acid and gallotanic acid). Non-limiting examples of useful tree barks containing one or more pigments are named above. In addition, during heat treatment, additional pigments may develop in the bark, in the wood, or in both, which contribute to the color of the fiber product. This is what is meant by "pigment precursors."

The amount, age, moisture, and/or other properties of the bark used may influence hue and/or intensity of the imparted color. For example, low quantities of bark may result in light brown color of the mulch composition or growing medium while high quantities of bark may result in dark brown color. At least about 1 weight %, about 3 weight %, preferably about 5 weight % of bark may be needed to obtain mulch or growing medium dyed by the bark pigments. To color-change the mulch or growing medium, about 1 to about 99 weight % of bark may be included in the initial composition, based on the total weight of the initial composition. Additional bark may be added during the process of producing mulch or growing medium so that the final color of the fiber product may be adjusted to the desired hue. Concerning the age of bark, the bark from the most recently debarked trees generally provides for the most intense color change of the wood components. Moisture of the bark may be about 30 to 60%, measured by ASTM D4442-07, to provide adequate color change of the wood components.

The fiber composition may have a color with a dominant wavelength from about 510 nm to about 780 nm, about 590 nm to about 770 nm, about 620 nm to about 760 nm, or about 675 nm to about 750 nm relative to a white illuminate. The term "dominant wavelength" refers to a way of describing polychromatic light mixtures in terms of monochromatic light that evokes an identical perception of hue. It is determined on the International Commission on Illumination (CIE)'s color coordinate space by a straight line between the color coordinates for the color of interest and the coordinates for the illuminate. The intersection at the perimeter of the coordinate space nearest the color of interest is the dominant wavelength. The fiber composition may have a red to brown to black color. The fiber composition may have hsl color coordinates such that the "h value" (hue) is from about 25 to about 45, the "s value" (saturation) is from about 20 to about 100, and the "1 value" (lightness) is less than about 50. The 1 value may be from about 0 to about 25.

The fiber composition may further include a non-permanent dye that is eventually removed, or which eventually fades, after the composition is opened by the fiber opening apparatus and applied in the field. Preferably, the non-permanent dye is non-toxic so that no toxic chemicals are leached from the opened fiber product into the environment. The non-permanent dye may comprise natural and/or synthetic compounds. The non-permanent dye may comprise compounds derived from plants, fungi, lichens, invertebrates, insects, minerals, the like, or a combination thereof. Any part of the plant may be utilized to provide the dye such as roots, petals, leaves, stems, shoots, stalks, hulls, husks, ripe and/or unripe fruit, seeds. Exemplary sources of plant dyestuffs include tree varieties named above; vegetables such as carrots, beetroot, red cabbage, artichoke, spinach, celery; fruit such as pomegranate, strawberries, avocado, cherries, raspberries, mulberries, elderberries, blackberries, grapes, peach; turmeric, fennel, basil, paprika, saffron, tea plants, coffee plants, barberry, bloodroot, lilac, coneflower, dandelion, goldenrod, hollyhock, ivy, St John's Wort, yellow dock, rose, lavender, cornflower, hyacinth, Queen Anne's Lace, hibiscus, daylily, safflower, camellia, snapdragon, nettle, milkweed, peony, Black-eyed Susan, hydrangea, chamomile, alfalfa, crocus, marigold, or the like. Exemplary mineral-based dyestuffs include iron oxide and carbon black. Exemplary useful non-permanent dye includes ELCOMENT BLACK 7822 commercially available from Greenville Colorants. Another exemplary type of non-permanent dye may include green pigments.

The non-permanent dye may be combined with the bark alone and/or with the components alone before the initial composition is formed, with the initial composition, with the processed fiber composition, afterwards, or in more than one step. At least about 0.1 to about 2 weight % of non-permanent dye may be added to the initial composition to cause color change of the wood fiber, based on the total weight of the initial composition. About 0.1 to 15 weight % or more, about 2 to 10 weight %, about 3 to 7 weight % of the non-permanent dye may be added to the initial composition, based on the total weight of the initial composition. At least about 2-40 pounds of non-permanent dye may be added per ton of the final fiber composition to achieve color change.

Typically, the removable non-permanent dye imparts a darker color on the fiber composition than when the non-permanent dye is absent therein. The non-permanent dye may be washed away after several days such as about 1 to about 30 days or after a more extensive time period after being applied in the field. The non-permanent dye may fade away or begin to fade away (e.g., from exposure to sunlight or other environmental conditions) after several days such as about 1 to about 30 days or after more extensive time period after the bale is opened and the fiber-containing product is applied in the field. The fiber composition may have a light-fastness, in order of increasing preference, of at least up to 1 day, 5 days, 10 days, 20 days, 1 month, 2 months, or 3 months or more, with minimal fading, measured according to ASTM D4303-99. The light-fastness of the dyed mulch or growing medium may be about 1 to 120 days, about 5 to 90 days, about 10 to 30 days. The term "minimal fading" refers to any visually discernable extent of fading. The term "light-fastness" as used herein refers to the resistance of a pigment to color change upon exposure to light.

The fiber-containing product with the non-permanent dye may have a color with a color with a dominant wavelength from about 400 nm to about 780 nm, about 510 nm to about 770 nm, about 590 nm to about 760 nm, or about 620 nm to about 750 nm relative to a white illuminate. The color of the fiber composition including the non-permanent dye may vary. The fiber-containing product with the non-permanent dye may have a red to brown to black color. But other colors such as green, blue, yellow, orange, purple, or gray hues are contemplated as well. The type and amount of dye determine intensity of the color. Typically, the removable non-permanent dye imparts a darker color on the fiber-containing product than when the non-permanent dye is absent therefrom. Alternatively, the fiber-containing product with the non-permanent dye may have a lighter color than when the non-permanent dye is absent therefrom. The fiber-containing product may have a lower "h value" than the fiber-containing product without the non-permanent dye. The fiber-containing product may have hs1 color coordinates such that the "h value" (hue) is from about 10 to about 40, the "s value" (saturation) is from about 20 to about 100, and the "1 value" (lightness) is less than about 50. The 1 value may be from about 0 to about 25.

The fiber composition may be dyed by bark pigments and/or by one or more natural non-permanent dyes in order to comply with organic standards and secure a certificate from the Organic Materials Review Institute (OMRI).

The fiber composition advantageously can provide balanced air and water holding capacity at about 25-60 volume % each, preferably between about 43-56 volume % each, more preferably about 48-49 volume % each, based on the total volume of the growing medium, measured in a container having dimensions 30.5×30.5×30.5 cm (12 inches×12 inches×12 inches). The air and water holding capacity may each be without limitation, about 20 volume % or more, 25 volume % or more, 30 volume % or more, 35 volume % or more, 40 volume % or more, 45 volume % or more, 50 volume % or more, 55 volume % or more, 60 volume % or more, or 65 volume % or more, of the total volume of the fiber composition, when measured in 30.5×30.5×30.5 cm (12 inches×12 inches×12 inches) container. Balanced air (non-capillary) and water (capillary) holding capacity provides ideal growing conditions to plants. The volume of air space is important for root systems and plants in general, as without oxygen, roots cannot grow and absorb water or minerals. The more oxygenated the roots are, the more efficient the plants become in converting sugars into energy for plant growing. Likewise, sufficient water retention of the fiber composition is important to ensure that the roots have access to proper amount of water for photosynthesis, root growth, and efficient uptake of water by the growing plant without being oversaturated. Conventional growing mixes usually do not achieve balanced air and water retention as typically, when the volume % of water retention rises, it is at the expense of air retention and vice versa.

Water and air holding capacity, as referred to herein, are measured according to "Procedures for Determining Physical Properties of Horticultural Substrates Using the NCSU Porometer by Horticultural Substrates Laboratory," Department of Horticultural Science, North Carolina State University in Raleigh, N.C., which is incorporated in its entirety by reference herein. The water holding capacity is measured by a Container Capacity test which measures the percent volume of a substrate that is filled with water after the fiber composition is saturated and allowed to drain. It is the maximum amount of water the fiber composition can hold. The drainage is influenced by the height of the substrate, this property is thus dependent on container size. The taller the container, the more drainage it will cause, and the less capacity of the substrate to hold water. The oxygen holding capacity is measured as percent volume of a substrate that is filled with air after the fiber composition is saturated and allowed to drain. It is the minimum amount of air the material will have. It is affected by the container height in reverse fashion to container capacity; i.e., the taller the container, the more drainage and therefore more air space.

The sum of water and air holding capacity equal total porosity for a given density and moisture content. Total porosity defines the total volume of pores and refers to percent volume of a substrate that is comprised of pores, or holes. It is the volume fraction which provides the water and aeration in a substrate. The total porosity+the percent solids=100%. Total porosity of the fiber composition may be about 88 to about 99 volume %, about 91 to about 98 volume %, about 93 to about 97 volume %, about 94 to about 96 volume %. Total porosity of the fiber composition may be about 88 vol. % or more, 91 vol. % or more, 93 vol. % or more, 95 vol. % or more, 97 vol. % or more, 99 vol. % or more.

The water holding capacity (WHC) of the fiber composition may be also measured by ASTM D7367-14, a standard test method for determining water holding capacity of fiber mulches for hydraulic planting. According to ASTM D7367-14, the water holding capacity (WHC) of the fiber composition may be about 400 to about 1000 weight %, about 500 to 1000 weight %, about 600 to 900 weight %, based on the total weight of the fiber composition.

An additional advantage of the fiber composition is lower dry bulk density as well as wet bulk density when compared to prior art substrates. High density may impose transportation limits on the growing substrates as such substrates may reach their weight limit before they reach the volume limit feasible for transportation. When compared to higher density media, the lower wet and dry bulk densities of the fiber composition provide greater volume of the fiber composition to the end user at the same weight. The low density fiber composition may be added as a component to prior art media and thus lower their transportation costs by about 5% or more, 10% or more, 15% or more, or 20% or more, as compared to the prior art media alone. Additionally, a consumer may find it easier to purchase and utilize the fiber composition because of its lower weight. The dry bulk density of the fiber composition may be, in order of increasing preference, about 6 lb/ft$^3$ or less, 4 lb/ft$^3$ or less, 3 lb/ft$^3$ or less, or 2 lb/ft$^3$ or less. The dry bulk density of the fiber composition may be about 1.5 lb/ft$^3$ to about 6 lb/ft$^3$, about 2 lb/ft$^3$ to about 4 lb/ft$^3$, about 2.2 lb/ft$^3$ to about 2.6 lb/ft$^3$. The wet bulk density of the fiber composition may be, in order of increasing preference, about 15 lb/ft$^3$ or less, 10 lb/ft$^3$ or less, 8 lb/ft$^3$ or less, 6 lb/ft$^3$ or less, 4 lb/ft$^3$ or less, 3 lb/ft$^3$ or less, or 2 lb/ft$^3$ or less. The wet bulk density of the fiber composition may be about 2 lb/ft$^3$ to about 10 lb/ft$^3$, about 2.2 lb/ft$^3$ to about 5 lb/ft$^3$, about 2.4 lb/ft$^3$ to about 3 lb/ft$^3$.

Table 3 below illustrates test results for one embodiment of a fiber composition comprising about 80% wood components and about 20% tree bark and another embodiment comprising 100% pine wood fiber, based on the total weight of the fiber composition, in comparison to prior art growing media.

TABLE 1

Fiber composition properties

| Fiber composition | Volume of air space [vol. %] | Volume of air space-range [vol. %] | Dry bulk density [lb/ft$^3$] | Dry bulk density [kg/m$^3$] | Wet bulk density [lb/ft$^3$] | Wet bulk density [kg/m$^3$] | Moisture content [%] |
|---|---|---|---|---|---|---|---|
| Fiber composition of present invention (80% wood, 20% bark) | 30.25 | 25-75 | 2.37 | 37.96 | 2.83 | 45.33 | 90.99 |
| Fiber composition of present invention (100% pine wood fiber) | 44.53 | 25-75 | 2.20 | 35.24 | 2.49 | 39.89 | 89.80 |
| *Sphagnum* Peat | 10.22 | 5-25 | 4.25 | 68.08 | 12.04 | 192.86 | 85.78 |
| ⅜" Hammermilled Bark | 24.00 | 20-45 | 9.64 | 154.42 | 23.82 | 381.56 | 75.99 |
| Retruder Processed Bark | 14.69 | — | 7.46 | 119.50 | 19.85 | 317.49 | 84.56 |
| Coir Block Fiber | 15.36 | — | 4.42 | 70.80 | 32.55 | 521.40 | 89.33 |

The data in Table 3 was collected by JR Peters Laboratory Allentown, Pa., USA, using "Procedures for Determining Physical Properties of Horticultural Substrates Using the NCSU Porometer by Horticultural Substrates Laboratory," Department of Horticultural Science, North Carolina State University in Raleigh, N.C., which is incorporated in its entirety by reference herein.

The percent volume of air space in Table 3 refers to the air holding capacity discussed above which was measured as the percent volume of a substrate that is filled with air after the material is saturated and allowed to drain. It is the minimum amount of air the material will have. The measuring container had the following dimensions: 30.5×30.5×30.5 cm (12 inches×12 inches×12 inches).

The bulk density in Table 3 refers to the ratio of the mass of dry solids to the bulk volume of the substrate. The bulk volume includes the volume of solids and pore space. The mass is determined after drying to constant weight at 221° F. (105° C.), and volume is that of the sample in cylinders.

The moisture content in Table 3 refers to the percent moisture found in a sample on a wet mass basis. This is calculated by: [(Wet weight−Dry weight)/Wet weight]×100. It denotes how much of a particular sample is comprised of water.

Table 4 provides comparison of prior art growing media with two embodiments of the fiber composition, specifically one embodiment of a fiber composition comprising about 80% wood components and about 20% tree bark and another embodiment comprising 100% pine wood fiber, based on the total weight of the fiber composition. The loose bulk density data in Table 4 was gained by packing the fiber composition into a container measuring 30.5×30.5×30.5 cm (12 inches×12 inches×12 inches) after the fiber composition was expanded by an opener and/or by using a process recommended for the specific kind of fiber composition.

TABLE 2

Loose bulk density

| Fiber composition | Expanded bulk density including moisture content of the fiber composition | | Net dry weight expanded bulk density | |
|---|---|---|---|---|
| | [lb/ft³] | [kg/m³] | [lb/ft³] | [kg/m³] |
| Fiber composition of present invention (80% wood, 20% bark) | 1.2-1.75 | 25.63 | 0.9-1.35 | 20.82 |
| Fiber composition of present invention (100% pine wood fiber) | 1.0-1.65 | 20.82 | 0.75-1.25 | 16.02 |
| *Sphagnum* Peat | 9.0-12.5 | 144.17 | 5.0-6.85 | 80.09 |
| ⅜" Hammermilled Composted Pine Bark | 23-33 | 416.48 | 11.0-17.5 | 187.42 |
| ⅜" Hammermilled Aged Pine Bark | 15-20 | 277.12 | 7.5-10 | 177.80 |

Table 5 provides a size classification of the fiber of the fiber composition; the weight % of material passing through various sieve sizes as well as density, WHC, and total porosity are also provided. Total porosity was measured by the porometer testing "Procedures for Determining Physical Properties of Horticultural Substrates Using the NCSU Porometer by Horticultural Substrates Laboratory," as referenced above.

TABLE 3

Wood fiber size classification

| | | Materials: wt. % wood components/wt. % bark | | | | | |
|---|---|---|---|---|---|---|---|
| | | 90%/10% | 70%/30% | 50%/50% | 30%/70% | 10%/90% | ranges |
| Sieves | #8 [wt. %] | 15.9 | 26.7 | 21.0 | 8.6 | 4.7 | 4-25 |
| | #16 [wt. %] | 23.8 | 16.3 | 9.6 | 10.1 | 8.9 | 9-30 |
| | #25 [wt. %] | 25.0 | 14.9 | 12.5 | 13.7 | 10.1 | 15-35 |
| | #50 [wt. %] | 20.7 | 17.6 | 25.6 | 27.0 | 25.4 | 15-30 |
| | #100 [wt. %] | 10.0 | 13.5 | 15.4 | 21.1 | 20.4 | 6-15 |
| | pan [wt. %] | 4.6 | 11.0 | 15.9 | 19.5 | 26.4 | 2-20 |
| Total porosity | Porometer [vol. %] | 96-99 | 94-98 | 93-97 | 91-95 | 88-94 | 88-99 |
| Density | Range [lb/ft³]; [kg/m³] | 1.5-2.0; 24-32 | 1.5-2.5; 32-40 | 2.0-3.25; 40-52 | 3.0-5.0; 64-80 | 3.5-6.5; 56-104 | 1.5-6.5; 24-104 |
| WHC | ASTM D7367-14 [wt. %] | 825-925 | 725-825 | 625-725 | 500-625 | 400-500 | — |

The sieve size of the fiber particles in the fiber composition may range from US sieve size #8 to #100, but other sieve sizes are contemplated. The size of the fiber in the fiber composition may range from about 0.149 mm to about 2.38. Some of the wood components and/or bark may be processed in such a way that they become a powder with a particle size of about 30 μm or smaller to about 600 μm or larger. Generally, the smaller the fiber size, the higher the WHC.

In the Table 5 above, 79.5% of the wood/bark fiber components of the composition having 90 wt. % wood components and 10 wt. % bark, has a particle size smaller than 2036 μm and larger than 150 μm. 62.3% of the wood/bark fiber components of the composition having 70 wt. % wood components and 30 wt. % bark has a particle size smaller than 2036 μm and larger than 150 μm. 63.1% of the wood/bark fiber components of the composition having 50 wt. % wood components and 50 wt. % bark has a particle size smaller than 2036 μm and larger than 150 μm. 71.9% of the wood/bark fiber components of the composition having 30 wt. % wood components and 70 wt. % bark has a particle size smaller than 2036 μm and larger than 150 μm. 64.8% of the wood/bark fiber components of the composition having 10 wt. % wood components and 90 wt. % bark has a particle size smaller than 2036 μm and larger than 150 μm.

The initial composition is heated to an elevated temperature to kill microbes in a pressurized vessel. Typically, the heating step may be conducted at a temperature in the range of about 250° F. (121° C.) or lower to about 500° F. (260° C.) or higher, about 300° F. (149° C.) to about 400° F. (204° C.), about 320° F. (160° C.) to 380° F. (about 193° C.). The heating step may be conducted for a time sufficient to kill microbes. The heating step may be conducted for about 1 to about 5 minutes or longer under a steam pressure of about 35 lbs/in² (102 kg/cm²) to about 120 lbs/in² (351 kg/cm²) or about 50 lbs/in² (146 kg/cm²) to about 100 lbs/in² (293 kg/cm²). For example, the heating step may be conducted at a temperature of about 300° F. (149° C.) for about 3 minutes at about 80 lbs/in² (234 kg/cm²). The heating step results in a preferably substantially sterile growing medium. Preferably, the heating step results in a substantially sterile growing medium. Some of the pigments and/or pigment precursors may impart its color to at least a portion of the wood components during the heating step. The steam flow rate during the heating step may be from about 4000 lbs/hour (1814 kg/hour) to about 15,000 lb/hour (6803 kg/hour).

An example of a pressurized vessel and related process is disclosed in U.S. Pat. No. 2,757,150, which has been incorporated by reference, in which wood chips are fed to a pressurized steam vessel which softens the chips. Any type of wood chip may be used in this process, but wood chips of the softwood varieties such as yellow poplar, and particularly pine, are preferred.

The initial composition is subsequently processed through a refiner to form the mulch composition or growing medium. The refiner may use a plurality of disks to obtain the mulch composition or growing medium. The refiner may use two or more disks, one of which is rotating, to separate wood fibers from each other as set forth in U.S. Pat. No. 2,757,150, the entire disclosure of which is hereby incorporated by reference. The refiner is generally operated at a lower temperature than the temperature in the pressurized vessel. The refiner may be operated at a temperature in the range of about 70° F. (21° C.) to about 400° F. (204° C.), about 150° F. (150° C.) to about 350° F. (176° C.), about 200° F. (93° C.) to about 300° F. (148° C.). The refiner may be operated under steam. The refiner may be operated at atmospheric pressure or elevated pressures such as pressures of about 50 lb/in$^2$ (146 kg/cm$^2$) or lower to about 100 lb/in$^2$ (293 kg/cm$^2$). The refiner may be operated at such temperatures and pressures that enable the pigments and/or pigments precursors in the bark, and optionally pigments and/or pigment precursors in the source of non-permanent dye, to impart its color to the wood fibers. The refiner step is conducted for a time sufficient to impart darker color of the bark and/or the color of the non-permanent dye to the fibers. The refiner produces fibers that are thinner than those that would be obtained without such processing.

A growing medium or mulch is thus prepared which may be further refined while additional components such as fertilizers, as set forth above, may be added. Subsequently, the resulting fiber composition is compressed into the bales for transportation.

The fiber opening apparatus to which the compressed fiber is supplied may comprise a plurality of sections. The fiber opening apparatus may comprise at least one or more of the following sections: a transportation section, a fiber bale breaker, a feeder, a fiber opener, an input section, a mixing section, or a combination thereof. Some or all of these sections may be attached to one another, either temporarily or permanently. The plurality of sections may be arranged in more than one order as long as the fiber opening apparatus is capable of lowering density of the highly compressed wood and/or bark fiber, in order of increasing preference, by at least about 50% or more, 60% or more, 70% or more, 80% or more, 90% or more. The fiber opening apparatus may be connected to other production systems, temporarily or permanently. The number and dimensions of each section will depend on requirements of a specific application, especially on the target fiber density. A single section may fulfil a function of one or more sections such as the mixing section may also serve as a fiber opener section.

Figure 2:
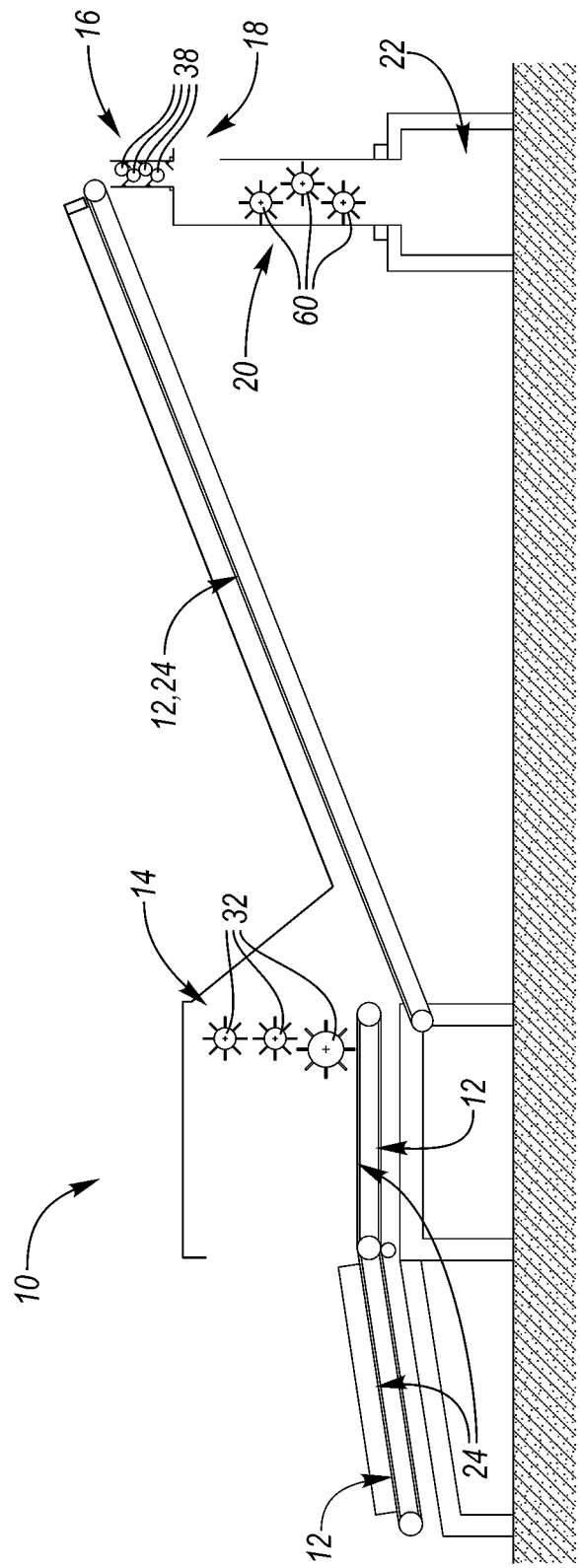
FIG. 2 shows a schematic side view of a fiber opening apparatus.
Figure 3A:
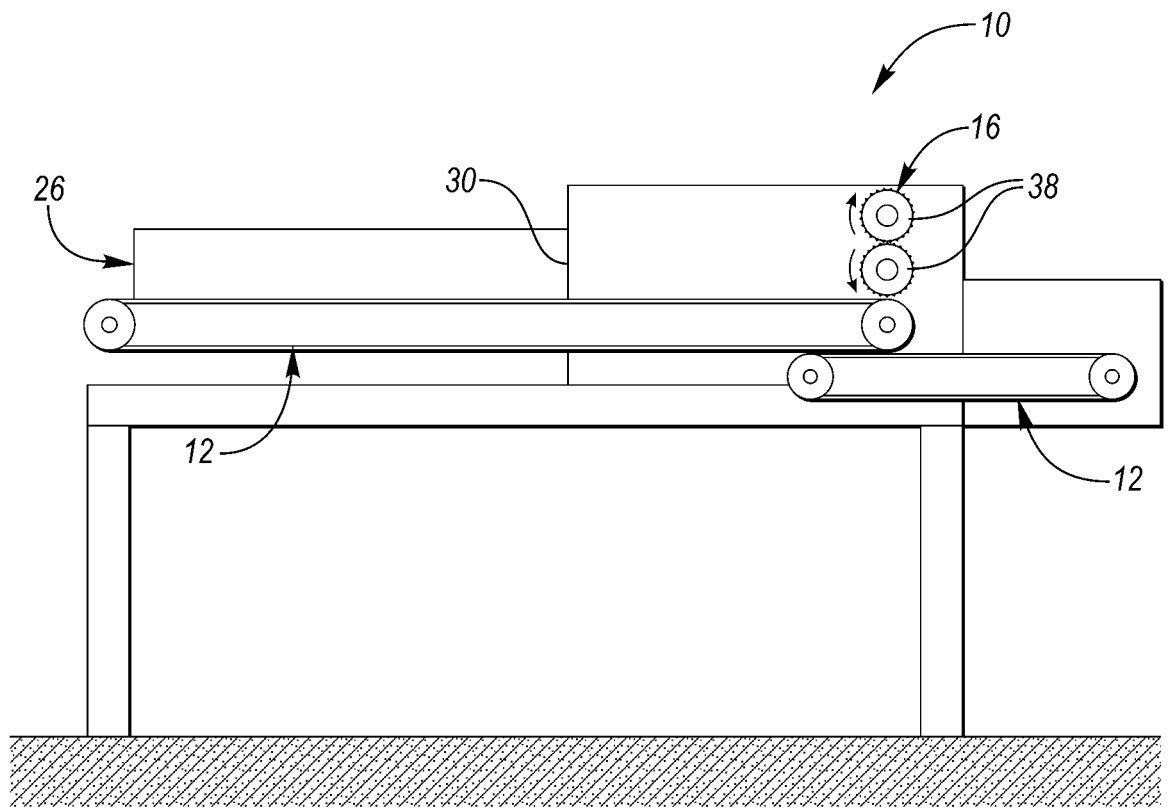
FIG. 3A illustrates a schematic side view of another fiber opening apparatus.
Figure 3B:
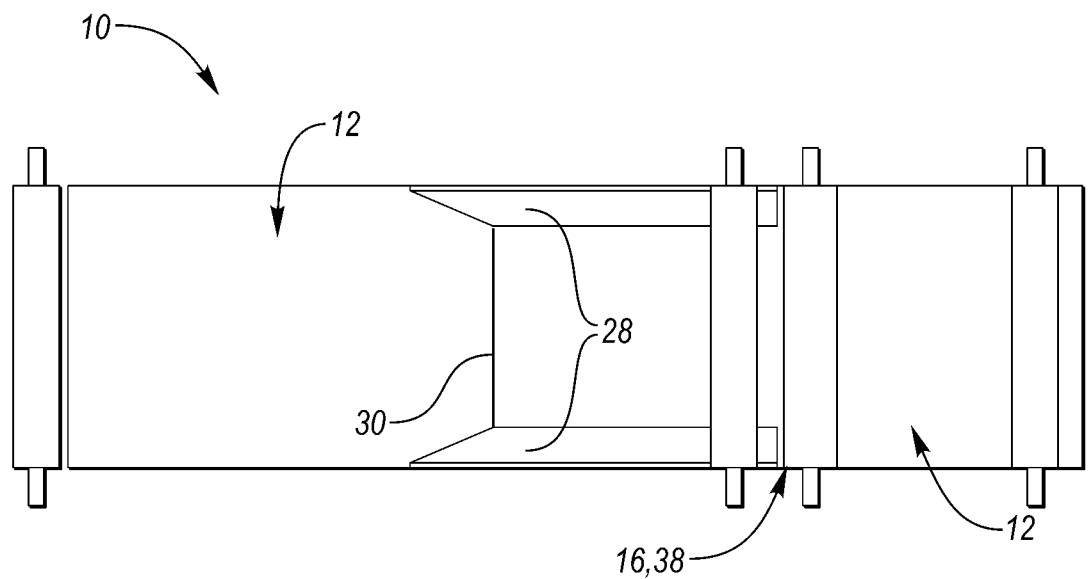
FIG. 3B illustrates a top view of the fiber opening apparatus of FIG. 3A.

As can be seen in FIG. 2, a fiber opening apparatus 10 comprises a plurality of transportation sections 12, a bale breaker 14, a fiber opener section 16, an input section 18, a mixing section 20, and a packaging section 22. FIGS. 3A and 3B show a fiber opening apparatus 10 comprising a transportation section 12 directly connected to the fiber opener 16.

A transportation section 12 may deliver a bale of fiber and/or partially or fully opened wood and/or bark fiber to other sections of the fiber opening apparatus 10, for example to the bale breaker 14, the fiber opener 16, or the mixing section 20, to another production system, or outside of the fiber opening apparatus 10. A transportation section 12 may comprise any kind of a transportation device capable of fulfilling this function. The transportation section 12 may comprise a conveyor 24 of any kind, for example a conveyor belt, a screw conveyor, an angled conveyor; or a platform; an auger; a bucket elevator; an apron; the like, or a combination thereof. The surface of the transportation device may be roughened to prevent slipping of the bales and/or fiber, but a smooth surface of a transportation device is contemplated as well. The transportation section 12 may be open, at least partially enclosed, or fully enclosed. Non-limiting examples of a transportation section 12 are depicted in FIGS. 2, 3A, and 3B; the transportation section 12, as depicted, comprises conveyor belts 24. As is illustrated in FIGS. 3A and 4, the transportation section 12 may include one or more removable guards 26 preventing pieces of fiber falling off of the transportation device.

Figure 4:
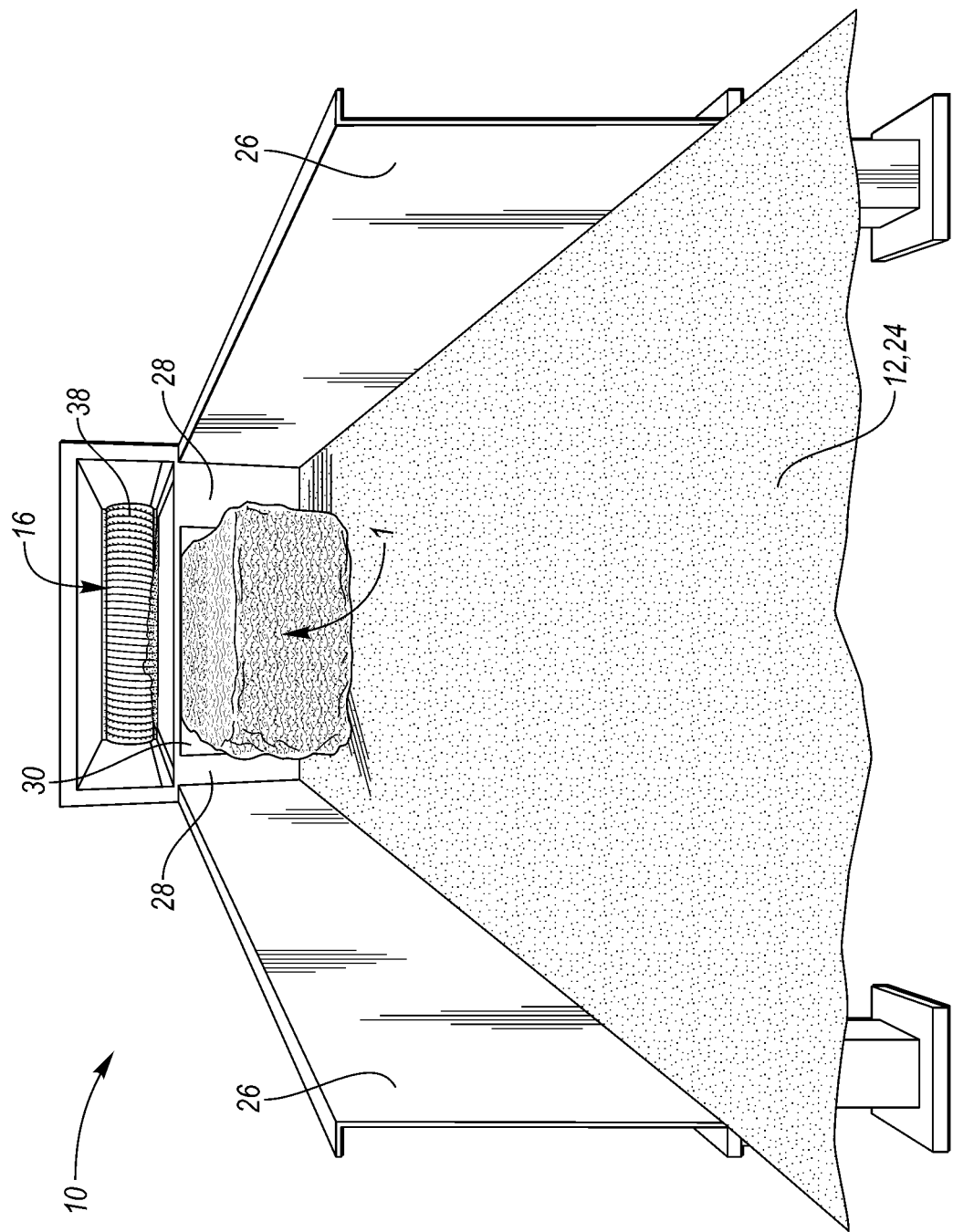
FIG. 4 shows a perspective front view of the fiber opening apparatus of FIGS. 3A and 3B.

As FIGS. 3B and 4 illustrate, the transportation device 12 may further include one or more removable inserts 28 for adjusting dimensions of an opening 30 leading to other sections of the fiber opening apparatus 10 such as an opening 30 leading to a bale breaker 14, to the fiber opener 16, to the mixing section 20, to the packaging section 22, or a combination thereof. Adjusting the dimensions of the opening 30 according to the dimensions of a bale 1 helps to guide the bale 1 to an adjacent section such as the fiber opener 16 in FIG. 4 and ensures that the fiber opener 16 can properly engage the bale 1. FIG. 4 illustrates that the inserts 28 may be installed to create uneven adjustments on each side of the opening 30. For example, the dimensions of each insert 28 may differ to better serve requirements of each application. Alternatively, the dimensions of at least one of the inserts 28 may be adjustable so that the same inserts 28 can be used to accommodate a variety of bales.

Figure 6:
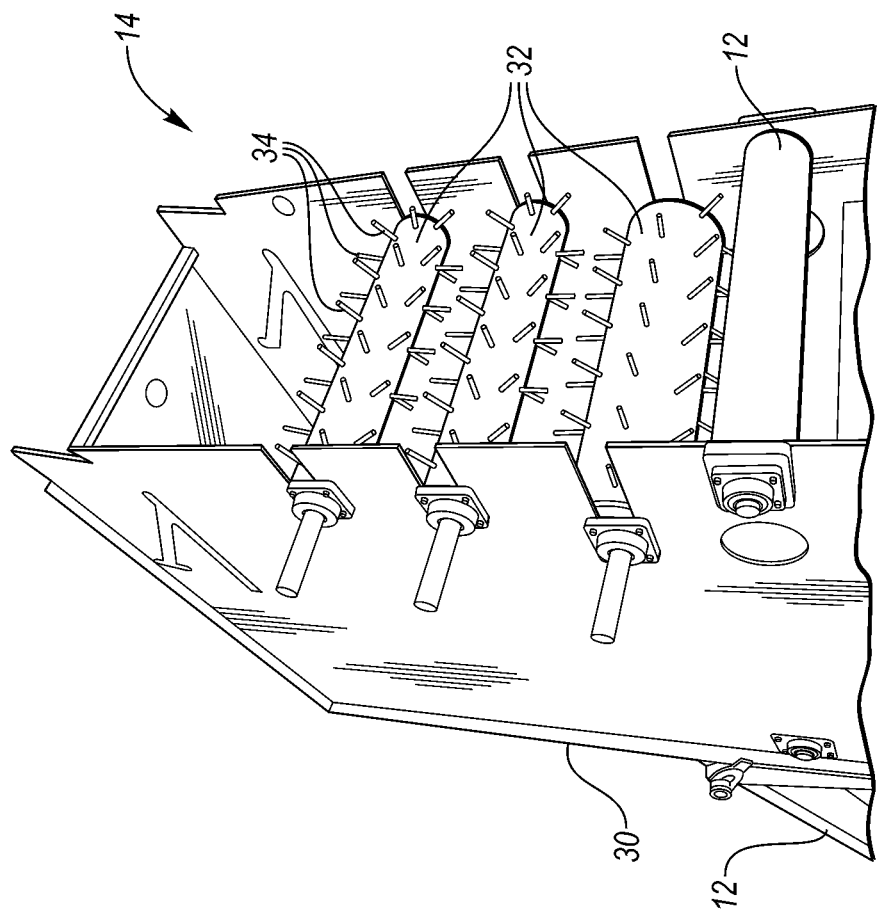
FIG. 6 shows a perspective back side view of a bale breaker of the fiber opening apparatus of FIG. 2.
Figure 5:
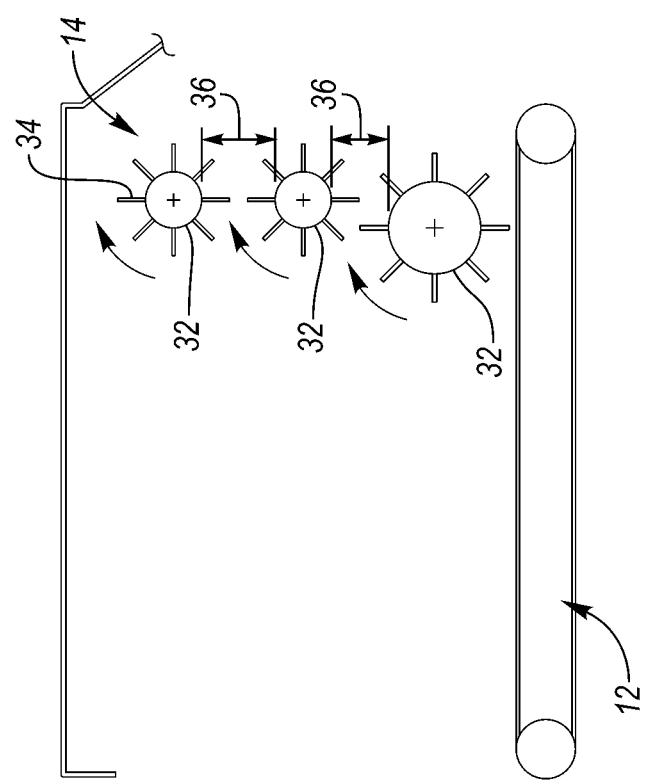
FIG. 5 shows a schematic detailed side view of a bale breaker of the fiber opening apparatus of FIG. 2.

To initiate breaking of the input fiber from the highly compressed wood and/or bark fiber bales 1, the fiber opening apparatus 10 may comprise a bale breaker 14, examples of which are depicted in FIGS. 5 and 6. The bale breaker 14 may receive input fiber in the form of a bale 1 or partially opened fiber.

The bale breaker 14 may comprise one or more beater members 32. The one or more beater members 32 are capable of dividing the input fiber into pieces. The one or more beater members 32 mechanically divide a bale of input fiber 1 into pieces of fiber. The beater members 32 are capable of rotating clockwise and/or counter clockwise so that projections 34 of the beater members 32 may access the bale of input fiber 1, enter the bale 1, tear through the bale 1, remove pieces of fiber from the bale 1, and thus create partially opened fiber.

The beater members 32 may have any size, shape, or configuration. For example, the beater members 32 may be cylindrical. The beater members 32 may have the same or different dimensions. For example, the top beater member 32 may have a larger diameter than at least one of the lower beater members 32. Exemplary diameters of the beater member 32 may range from 2 cm to 2 m or more; however, any diameter of the beater members 32 is contemplated.

The beater members 32 may be arranged one above the other or be arranged in a variety of different configurations so that the beater members 32 can remove the input fiber from the bales 1 and/or at least partially open the fiber. The beater members 32 may be stacked or staggered. FIG. 5 illustrates three beater members 32 comprising two upper cylindrical beater members 32 of identical dimensions and a bottom cylindrical beater member 32 having a larger diameter than the upper beater members 32. At least one of the beater members 32 may be spatially offset from the rest of the beater members 32. As can be seen in FIG. 6, the bottom-most beater member 32 is offset by being located closer to the opening 30 than the remaining beater members 32.

The beater members 32 may comprise a plurality of projections 34 such as those shown in FIGS. 5 and 6. The beater members 32 may be separated by a distance creating a gap 36 allowing projections 34 of the beater members 32 to freely rotate around their axis without encountering projections 34 of a neighboring beater member 32 while allowing pieces of fiber to pass between the beater members 32. The gap 36 may be adjustable and the amount of throughput fiber may be controlled by regulating the size of the gap 36. The input fiber may be received by all of the beater members 32 at the same time or by one beater member 32 at a time. The input fiber may be first supplied to the bottom-most beater member 32 or the top-most beater member 32, depending on the requirements of a specific application and a transportation device supplying the input fiber to the beater members 32.

The plurality of projections 34 are capable of separating bales of input fiber 1 into pieces of fiber. The pieces of fiber separated by the bale breaker 14 may measure about 1/64 inch (about 0.4 mm) or less to about 10 inches (about 25.4 cm) or more in diameter, more preferably about 1/8 inch (about 3.18 mm) to about 5 inches (about 12.7 cm) in diameter, even more preferably about 1/2 inch (about 1.27 cm) to about 2 inches (about 5.08 cm) in diameter, most preferably about 1/4 inch (about 0.64 cm) to about 1 inch (about 2.54 cm) in diameter.

The projections 34 may have any size, shape, or configuration thereof to engage the bales 1 and separate the bales 1 into pieces of fiber. The projections 34 may be shaped like spikes, nails, pins, spears, studs, pegs, screws, the like, or a combination thereof. In FIGS. 5 and 6, the projections 34 are shaped like spikes. The projections 34 may have sharp or dull edges. The projections 34 may have rough or smooth surface or rough and smooth portions. Each beater member 32 may have one or more horizontal and/or vertical rows of projections 34. Each horizontal and/or vertical row of projections 34 may have one or more projections 34. Preferably, the total number of projections 34 is such that the bale breaker 14 is capable of dividing the bales of input fiber 1 into pieces of fiber. Preferably, the configuration of projections 34 is such that the projections 34 are equally spaced apart in each row. Even more preferably, the projections 34 may be configured in an offset pattern so that the beater members 32 may engage the entire area of the bales 1. As is illustrated in FIG. 6, each cylindrical beater member 32 may comprise eight horizontal rows of projections 34, each row comprising six projections 34 which are equally spaced apart in an offset pattern to cover as large of an area of a bale 1 to be opened as possible.

FIG. 5 further illustrates all beater members 32 rotating clockwise. But other embodiments are contemplated in which all or at least one beater member 32 rotates counter-clockwise or in which at least some of the beater members 32 rotate in the opposite direction than other beater members 32. The rotation of at least some beater members 32 may be adjustable.

The pieces of fiber from the bale breaker 14 may be transported to a fiber opener section 16 on a transportation device such as a conveyor belt 24 illustrated in FIG. 2. Alternatively, the bale 1 containing input fiber may be transported directly to the fiber opener 16, as is illustrated in FIGS. 3A, 3B, and 4. The fiber opener section 16 may be open or at least a partially enclosed chamber. FIGS. 3A and 4 show a partially enclosed fiber opener section 16 having adjustable dimensions due to removable inserts 28. As was already stated, the dimensions of the opening 30 may be adjusted with removable inserts 28 according to demands of a specific application and especially dimensions of incoming bale 1. The fiber opener section 16 may comprise fiber opening elements capable of lowering density of the fiber. The fiber density may be lowered by at least about 50% or more, 60% or more, 70% or more, 80% or more, or 90% or more, depending on the requirements of a specific application. The fiber opening elements may have any size, shape, or configuration thereof to fulfill this function. Preferably, the fiber opening elements are rotating members 38. Even more preferably, the rotating members 38 are rollers. Most preferably, the rotating members 38 are cylindrical rollers covered with wire.

Figure 7:
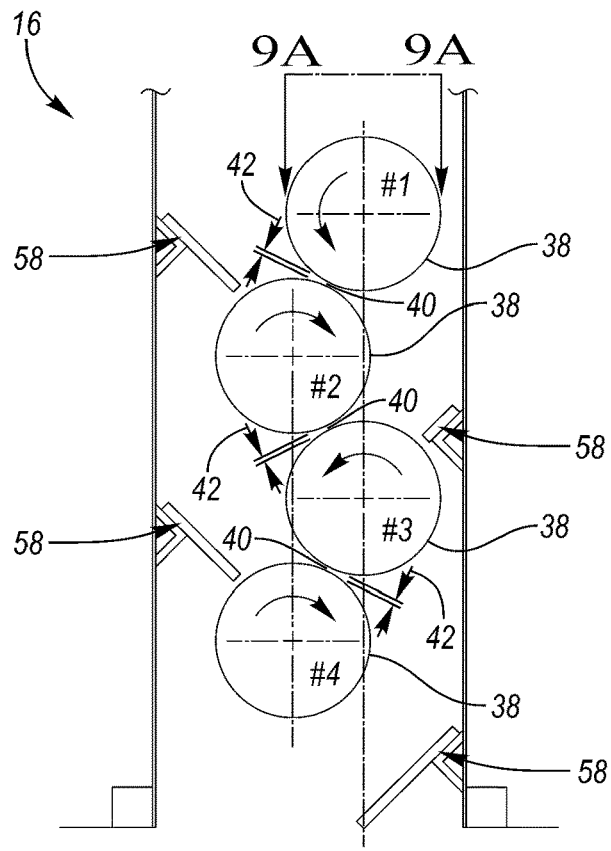
FIG. 7 illustrates a schematic side view of a fiber opener of the fiber opening apparatus of FIG. 2.
Figure 8:
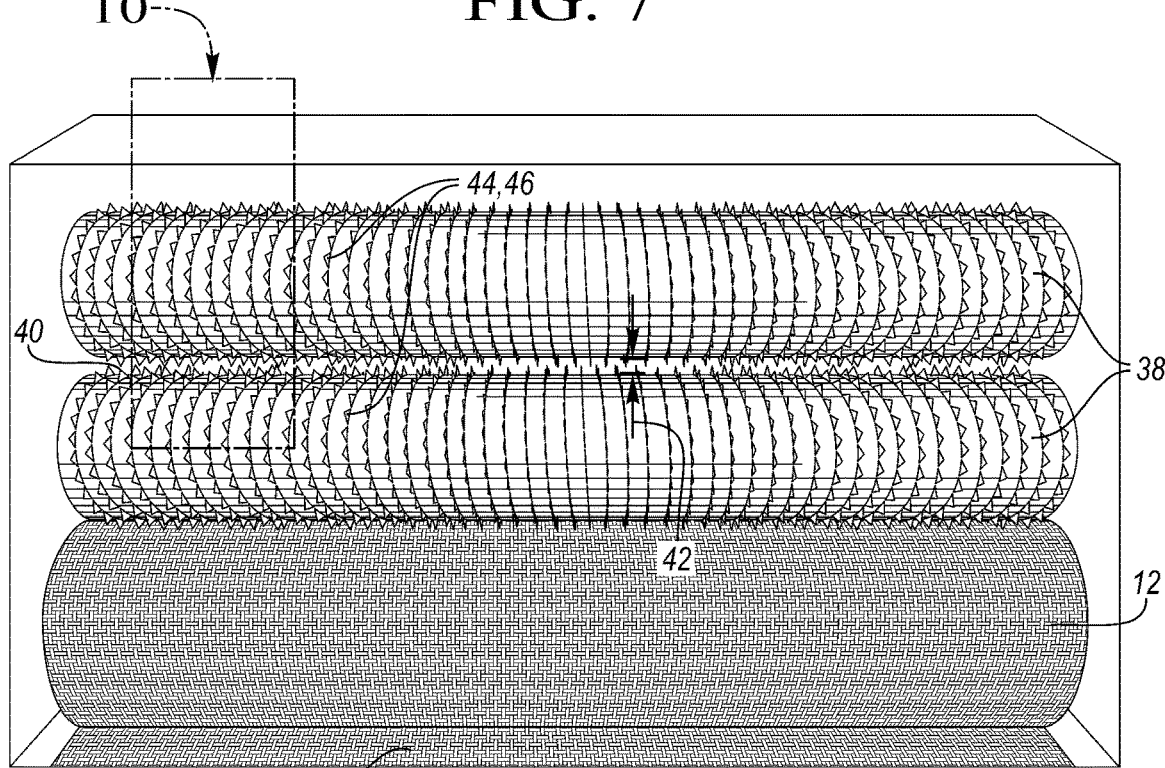
FIG. 8 shows a perspective back view of a transportation device and a fiber opener of the fiber opening apparatus of FIGS. 3A and 3B.

The number of rotating members 38 may vary, depending on requirements of a specific application. For example, the fiber opener section 16 may contain a series of four rotating members 38, as is depicted in FIG. 7, but any number of rotating members 38 is contemplated, especially for applications with higher volume of input fiber. The fiber opener 16 may include two rotating members 38, as is illustrated in FIG. 8. The rotating members 38 may be positioned one above the other, as is depicted in FIG. 8, or in an offset manner, as is illustrated in FIG. 7. As FIG. 7 further illustrates, every other rotating member 38 may be offset in relation to the first rotating member 38.

The rotating members 38 may be in contact with each other or be positioned in close proximity to one another so that a distance between two rotating members 38 defines a gap 42. The "gap" refers to a distance between surfaces of adjacent rotating members without a wire. The gap 42 between the rotating members 38 may be adjustable and may be increased or decreased depending on the requirements of a specific application so that a percentage by which fiber density is lowered may be controlled. The gap 42 may be decreased to open tighter-bound fiber or increased to increase throughput of fiber. Exemplary length of the gap 42 may be less than 1 mm, 1 mm or more, 5 mm or more, 10 mm or more, 5 cm or more, or 10 cm or more.

The distance 42 between adjacent rotating members 38 including wire 44 may be sufficiently small to create at least one pinch point 40. The adjacent rotating members 38 are positioned relative to each other to provide the at least one pinch point 40 between the adjacent rotating members 38, the adjacent rotating members 38 separate the fibers as the fibers pass through the at least one pinch point 40 so that the density of the fiber is lowered by at least 50-95%.

The "pinch point" is a point between adjacent fiber opening elements in which fiber is engaged by the fiber opening elements at the same time so that the fiber is torn, pulled, shredded, or otherwise rendered open and separated into individual strings of fiber. Preferably, fiber is directed to each pinch point 40 between adjacent rotating members 38 and passed through each pinch point 40 to separate the fiber into a plurality of strings of fiber so that the density of the fiber is lowered by at least 50-95%. In FIG. 7, fiber is directed to three pinch points 40; the first pinch point 40 being located between rotating members #1 and #2, the second pinch point 40 being located between rotating members #2 and #3, and the third pinch point 40 being located between rotating members #3 and #4.

FIG. 8 illustrates a pinch point 40 between two rotating members 38 located directly above each other. The pinch point 40 assists in expanding the volume of the incoming fiber. As the rotating members 38 engage the incoming fiber which is advanced to and through the pinch point 40, the surface of rotating members 38, such as a wound wire including a plurality of projections 46, tears the fiber apart. The fiber is thus extensively opened as the fiber passes through each pinch point 40 between the rotating members 38.

As is depicted in FIG. 7, the fiber opener 16 may comprise two sets of rotating members 38, rotating members 38 of the first set rotating in the same direction and in the opposite direction than the rotating members 38 of the second set. The first rotating member 38 may turn counter clockwise into the second rotating member 38 and the second rotating member 38 may turn clockwise into the first rotating member 38. When third and fourth rotating members 38 are included such as is depicted in FIG. 7, the third rotating member 38 may turn counter clockwise into the fourth rotating member 38, and the fourth rotating member 38 may turn clockwise into the third rotating member 38. Additional rotating members 38 can be added to the configuration. The direction in which each rotating member 38 turns may be altered as desired as at least some of the rotating members 38 may rotate clockwise and counter clockwise. Alternatively, as is depicted in FIG. 8, two rotating members 38 may rotate in different directions and turn into each other. But the rotating members 38 may be adjusted so that both rotating members 38 rotate in the same direction.

The pieces of fiber or a bale 1 are delivered to the fiber opener 16 in such a manner that fiber is engaged by at least one rotating member 38. The fiber is subsequently crushed, pressed, squeezed, pushed, and/or torn apart in at least one pinch point 40 between adjacent rotating members 38 so that the individual fibers are pulled apart and density of the fiber is lowered. The fiber may be further passed onto additional rotating members 38 and through at least one additional pinch point 40 to further lower the fiber density.

The rotating members 38 are made from a material that enables the rotating members 38 to lower fiber density. Preferably, the rotating members 38 are made from metal such as steel, iron, aluminum, the like, or a combination thereof. Other metals and materials such as thermosetting plastics are contemplated. Even more preferably, a wire 44 is wound around at least a portion of or around the entire surface area of at least one rotating member 38.

The wire 44 may be made from metal or another material which is sharp enough to tear pieces of fiber apart. The wire 44 may be any suitable commercially available wire. The wire 44 may include projections 46 assisting in lowering the fiber density by engaging the pieces of fiber and tearing them apart. The projections 46 may have any size, shape, or configuration. The projections 46 may have uniform or varying dimensions. Exemplary length and/or height of at least some of the projections 46 may be less than about 5 mm, 5 mm or more, 10 mm or more, 15 mm or more, 20 mm or more, 25 mm or more, 35 mm or more, 50 mm or more, depending of requirements of a specific application. The length and/or height of the projections 46 may be 3 mm to 60 mm, 15 mm to 35 mm, 20 mm to 30 mm. The length and/or height of the projections 46 may be 3 mm to 60 mm, 15 mm to 35 mm, 20 mm to 30 mm. Exemplary width of at least some of the projections 46 may be less than about 1 mm, 1 mm or more, 5 mm or more, 10 mm or more, 20 mm or more, depending of requirements of a specific application. The width of the projections 46 may be about 0.1 to 20 mm, about 0.5 to 10 mm, about 1 mm to 5 mm.

Figure 9A:
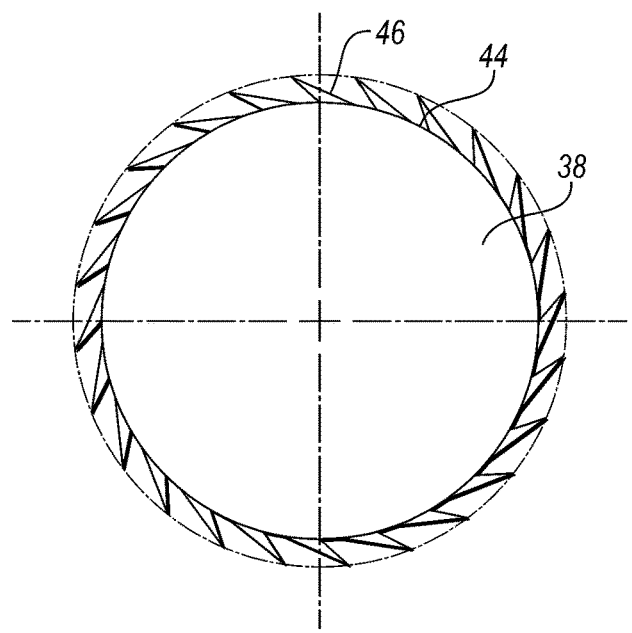
FIG. 9A shows a cross-section of a rotating member comprising a wire of FIG. 7.
Figure 9B:
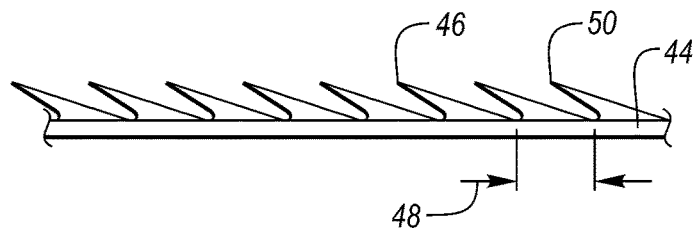
FIG. 9B shows a detailed view of the wire depicted in FIG. 9A.

The projections 46 may be shaped like nails, pins, spears, hooks, teeth, spikes, the like, or a combination thereof. The projections 46 may have a cross-section which is triangular, circular, square, rectangular, oval, angular, regular, irregular, or the like. Each rotating member 38 may include more than one kind of projections 46. The projections 46 may have sharp or dull edges. The projections 46 may have textured edges such as including protrusions to further assist in opening of the fiber. The projections 46 may be angled or be bent in the direction of rotation or in the opposite direction. In FIGS. 9A and 9B, the projections 46, shaped like hooks, are inclined in the direction of rotation. In FIGS. 10 and 11A, the pyramid projections 46 have a triangular cross-section, the projections 46 having a wide base 48 which gradually narrows at the top 50. The top 50 may be sharp and pointed or relatively dull. The sides of each projection 48 may be smooth or rough. The angle of individual sides of the projections 46 may vary. Exemplary angles may be about 30° or less, 40° or less, 50° or less, 60° or less, 70° or less, 80° or less, or more than about 80°.

Alternatively or in addition to projections 46, the rotating members 38 may include a plurality of depressions 47 which may assist with separation of the fiber into individual strings of fiber. Exemplary depressions 47 are depicted in FIG. 10.

The type of wire 44 wound around the surface of rotating members 38 may be the same on all rotating members 38 or different. One or more rotating members 38 may include at least one type of wire 44 with different amount and/or type of projections 46 per inch of wire 44 than remaining rotating members 38. Each wire 44 may have 1 projection per inch of wire or more, 2 projections per inch of wire or more, 4 projections per inch or wire or more, 6 projections per inch of wire or more, 10 projections per inch of wire or more; preferable are 3 projections per inch of wire. Each wire 44 may have 1 to 10 projections, 2 to 8 projections, or 3 to 6 projections per inch of wire. The rotating members 38 may have the following spacing of the projections 46 along the length or width of the rotating members 38: 1 row of projections per inch of rotating member 38 or more, 2, 3, 4, 5, 6, 7, 8, 9, 10, 11, 12, or more rows of projections per inch of rotating member 38. The rotating members 38 may have 1 to 15, 3 to 10, or 5 to 7 rows of projections per inch of rotating member 38.

The wire 44 may be wound in a variety ways. For example, the wire 44 may be wound on the surface of the rotating member 38 in such a way that the positioning of the wire 44 may be easily adjusted. Alternatively, the wire 44 may be wound sufficiently tight to assure that the wire 44 may not easily disengage and shift. Preferably, the wire 44 is wound spirally around the rotating member 38. In FIG. 10, a wire 44 is secured on the surface of the rotating members 38 by being set within a ridge 52. The ridge 52 allows the wire 44 to be secured tightly, but also determines spacing and positioning of the wire 44 on the surface of each rotating member 38. Alternatively or in addition to the insertion within a ridge 52, the wire 44 may be attached to at least one end of the rotating member 38 by welding or by another suitable technique.

Figures 9C, 9D:
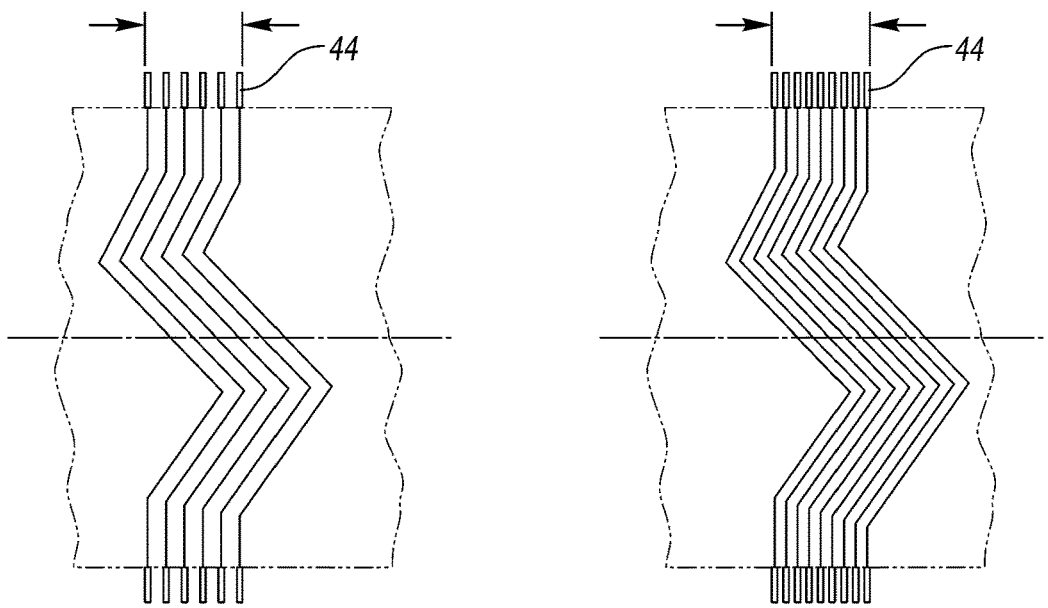
FIGS. 9C and 9D depict schematic views of a one inch section of a rotating member having rows of wound wire on its surface.

The wire 44 on at least one rotating member 38 may be wound in such a way that the rotating member 38 has 1 or more rows of wire per inch of each rotating member's width. FIG. 9C shows the rotating member 38 having 6 rows of wire per inch of the rotating member's width while FIG. 9D shows the rotating member 38 having 9 rows of wire per inch of rotating member's width.

FIGS. 10 and 11B illustrate that winding of a wire 44 on the rotating member 38 may create gaps 56 between rows of the wound wire 44. The gaps 56 may have any size, shape, or a configuration. The gaps 56 may be symmetrical, asymmetrical, regular, irregular, the like, or a combination thereof. Exemplary width of at least some of the gaps 56 may be less than about 1 mm, about 1 mm or more, about 5 mm or more, about 10 cm or more, or about 15 cm or more. The gaps 56 may be filled with another type of wound wire 44 or a different material. Alternatively, the gaps 56 may include one or more depressions 47.

Referring again to FIG. 7, the fiber opener section 16 may further contain one or more deflectors 58 which may assist in guiding individual pieces of fiber to the pinch points 40, to the rotating members 38, or both. The deflectors 58 may have any size, shape, or configuration to fulfill this function. For example, the deflectors 58 may be shaped like slides and/or angled in such a manner that when pieces of fiber encounter the deflector 58, the fiber is guided to a pinch point 40. The deflectors 58 prevent pieces of fiber from passing by the rotating members 38 without being engaged by the rotating members 38, and preferably by the wire 44 of the rotating members 38. The fiber opener section 16 may contain any number of deflectors 58. For example, the fiber opener 16 may contain one or more deflectors 58 per rotating member 38, as FIG. 7 illustrates. The deflectors 58 may be located on the walls of the fiber opener 16. The deflectors 58 may be temporarily or permanently attached to the fiber opener section 16.

Preferably, the opened fiber has the desired density upon exit from the fiber opener section 16. The opened fiber from the fiber opener section 16 may continue onto a transportation device which will discharge the opened fiber. Alternatively, the fiber may exit or be transported to another section such as a mixing section 20 or a packaging section 22, or to an additional fiber opening section 16 to open the fiber further. Alternatively still, the fiber may be transported to an input section 18 so that additional desired components such as peat, compost, bark, coir, nutrients, fertilizers, and other components named above, may be added to the opened fiber. An exemplary input section 18 is shown in FIG. 2. After the fiber is sufficiently opened, moisture can be added to the fiber to reduce dust, facilitate easier transport, or a combination thereof.

Figure 12:
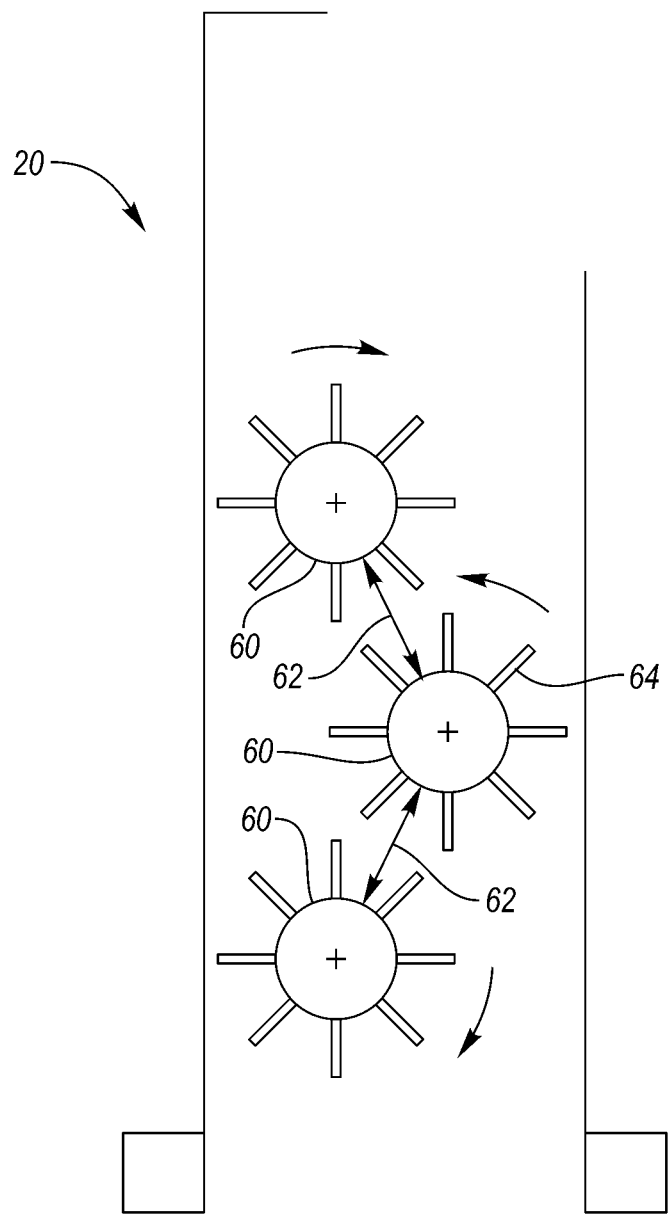
FIG. 12 shows a detailed schematic view of mixing members of the fiber opening apparatus of FIG. 2.

FIG. 12 depicts a mixing section 20 comprising at least a partially enclosed chamber for mixing the optional components supplied from the input section 18 and/or the partially opened fiber. The mixing section 20 may comprise one or more mixing members 60. The one or more mixing members 60 may mix individual optional components and/or the fiber. The mixing members 60 are capable of rotating clockwise and/or counter clockwise. All mixing members 60 may rotate clockwise or counter clockwise. Alternatively, at least some of the mixing members 60 may turn in the opposite direction than the other mixing members 60. The rotation of the mixing members 60 may be altered as desired. FIG. 12 depicts three mixing members 60; the first mixing member 60 rotating clockwise, the second mixing member 60 rotating counter clockwise, and the third mixing member 60 rotating clockwise.

All mixing members 60 may have the same or different dimensions. The mixing members 60 may have any size, shape, or a configuration. As is depicted in FIG. 12, the mixing members 60 may be cylindrical. The mixing members 60 may be arranged directly one above the other or in a variety of different configurations as long as the mixing members 60 are capable of engaging and properly mixing the optional components and/or fiber. The mixing members 60 may be stacked or staggered, as is illustrated in FIG. 12. Staggering of the mixing members 16 may aid proper mixing. The mixing members 60 may be separated by a distance creating a gap 62 allowing projections 64 of the mixing members 60 to freely rotate around the axis without encountering projections 64 of a neighboring mixing member 60 while mixing the optional components and/or fiber. The gap 62 may be adjustable so that the throughput of fiber may be regulated. The optional components and/or fiber may be received by the top or the bottom mixing member 60 first.

The one or more mixing members 60 may comprise projections 64 aiding mixing of the optional components and/or fiber. The projections 64 may have any size, shape, or a configuration thereof to engage the optional components and/or the partially opened fiber. The projections 64 may be shaped like spikes, nails, pins, spears, studs, pegs, screws, the like, or a combination thereof. In FIG. 12, the projections 64 are shaped like spikes. The projections 64 may have sharp or dull edges. The projections 64 may have rough or smooth surface. Each mixing member 60 may have one or more horizontal and/or vertical rows of projections 64. Each horizontal and/or vertical row of projections 64 may have one or more projections 64. Preferably, the total number and configuration of projections 64 is such that the optional components and/or fiber may be properly mixed. The projections 64 may be equally spaced apart in each row or configured in an offset pattern.

At least some of the mixing members 60 may be designed as rotating members 38, optionally wound with wire 40 just like the rotating members 38 in the fiber opener section 16 to provide further opening of fiber while mixing the fiber and/or optional components at the same time.

The optional components and/or the fiber may be discharged or transported to a packaging section 22 directly from the bale breaker 14, the fiber opening section 16, the input section 18, or the mixing section 20. As can be seen in FIG. 2, the partially opened fiber and/or optional components enter the packaging section 22 located downstream from the mixing section 20. Alternatively, the mixture may be transported by a conventional transport apparatus such as a conveyor to a packaging station remotely located.

The volume of opened fiber may be increased or decreased by regulating the rotational speed of at least one beater member 32, at least one rotating member 38, at least one mixing member 60, or a combination thereof. The frequency of rotation of any of the rotating members 32, 38, and 60 may be about 250 rpm or more, 500 rpm or more, 750 rpm or more, 1000 rpm or more, 1250 rpm or more, 1500 rpm, or more, 2000 rpm or more, or 3000 rpm or more. The frequency of rotation of any of the rotating members 32, 38, and 60 may be 150 to 3500 rpm, 250 to 2000 rpm, or 500 to 1000 rpm.

The invention also pertains to a process for lowering density of highly compressed fiber by opening the fiber and producing a growing medium or mulch including the opened fiber with lowered density. The process may comprise the following steps, wherein the steps may be performed in any order and repeated as desired. The process may include a step of loading one or more bales of fiber onto a transportation device which may supply the bales of highly compressed input fiber to a bale breaker. The process may include a step of passing at least one bale of the compressed fiber through a bale breaker before supplying the fiber to a fiber opener. The bale breaker may divide the one or more bales of highly compressed input fiber into smaller pieces, tearing the fiber apart, as well as beating and pulling apart pieces of fiber from the bale. The process may include a step of creating partially opened fiber by separating the bale into pieces of fiber. The process may further include a step of engaging the one or more bales with the projections of one or more beater members turning clockwise and/or counter clockwise. The process may further include a step of adjusting a gap between two or more beater members by increasing or decreasing the distance between beater members, changing the direction of rotation of at least some beater members, and/or adjusting the speed of rotation of at least some of the beater members. The process may further include a step of transporting the pieces of fiber or one or more bales of fiber to the fiber opener section and opening the fiber by passing the fiber between one or more rotating members of the fiber opener section. The process may include a step of engaging compressed or partially opened fiber with at least some of the plurality of projections of the rotating members. The rotating members may be rotating clockwise, counter clockwise, or a combination thereof. The process may include a step of adjusting the speed and/or direction of rotation of at least one of the rotating members and/or increasing and/or decreasing a gap between the one or more beater members. The process may include a step of pulling fiber apart, expanding and opening compressed or the partially opened fiber as pieces of fiber pass between the rotating members, through a pinch point, or both. The process may include a step of passing fiber through a pinch point between adjacent rotating members and thus opening the fiber as the fiber is being pressed, crushed, squeezed, pushed, and/or torn apart in the pinch point. The process may include a step of separating compressed or partially opened fiber into a plurality of strings of fiber in the pinch point. The process may include a step of decreasing the gap to open tighter-bound fiber or increasing the gap to increase throughput of fiber. The method may include guiding individual pieces of fiber and/or partially opened fiber to and/or through at least one pinch point by using one or more deflectors. The process may include a step of engaging fiber with one or more projections of one or more rotating members of the fiber opener section and opening fiber with wire rollers. The process may include a step of regulating capacity and volume of opened fiber by changing rotational speed of at least one beater member, at least one rotating member, at least one mixing member, or a combination thereof. The process may include a step of lowering density of fiber by at least about 50% or more, 60% or more, 70% or more, 80% or more, or 90% or more. The process may include a step of lowering the density of the substrate by at least about 50 to 99%, 70 to 95%, or 85 to 90%. The process may also include a step of supplying optional components from an input section. The process may further include a step of mixing the fiber and/or optional components in a mixing section by one or more mixing members. The process may include a step of packaging the at least partially or fully opened fiber. The process may include discharging the opened fiber. The process may include adding and/or removing one or more sections of the fiber opening apparatus as well as attaching one or more sections of the fiber opening apparatus to one another, for example by bolts, nuts, the like, or a combination thereof, temporarily or permanently. The process may include adding the opened fiber as a component into a growing medium or mulch. The process may include a step of forming a growing medium or mulch including the opened fiber.

This disclosure also relates to a growing medium or mulch prepared by the process described above. The resulting growing medium or mulch includes the fiber opened by the fiber opening apparatus. The resulting density of the mulch or growing medium including the opened fiber is lower than the density of the fiber in a compressed bale by about 50% or more, 60% or more, 70% or more, 80% or more, or 90% or more. The resulting growing medium or mulch may be applied hydraulically. The resulting density of the mulch or growing medium including the opened fiber is lower than the density of the fiber in a compressed bale by at least about 50 to 99%, 70 to 95%, or 85 to 90%.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A compressed growing medium or mulch fiber opener comprising:
    at least one set of adjacent rotating members, each rotating member having a surface including at least one wire wound around at least a portion of the surface and ridges on the surface, the at least one wire being secured within the ridges and including a plurality of projections each having a base portion and four sides, the base portion gradually tapered to a top end on each one of the four sides, the projections configured to open and expand compressed or partially opened growing medium or mulch fiber comprising wood and/or bark fiber; and
    the adjacent rotating members being positioned relative to each other to provide at least one pinch point between the adjacent rotating members, the adjacent rotating members capable of separating fibers as input fiber passes through the at least one pinch point so that a density of passing fiber is lowered by at least 85%, relative to a density of the input fiber.

2. The fiber opener according to claim 1, wherein a distance between the rotating members is adjustable.

3. The fiber opener according to claim 1, wherein each rotating member has a width, wherein the at least one wire comprises at least six rows of wire with the plurality of projections per inch of the width.

4. The fiber opener according to claim 1, wherein the at least one wire includes at least three projections per inch of wire length.

5. The fiber opener according to claim 1, wherein the at least one wire includes continuously running projections.

6. The fiber opener according to claim 1, wherein at least some projections are pyramids having a triangular cross-section and a base which gradually narrows at a top of the pyramid.

7. The fiber opener according to claim 1, further comprising a bale breaker located upstream of the rotating members, the bale breaker including one or more rotating beater members, the one or more beater members including a plurality of projections, the plurality of projections engaging the compressed growing medium or mulch fiber to separate a growing medium or mulch fiber into pieces of fiber; and
    optionally a component input section supplying additional components, a transportation section, a mixing section, a packaging section, or a combination thereof.

8. The fiber opener according to claim 7, wherein at least one of the rotating members and/or beater members has a rotational speed of at least 250 rpm.

9. The fiber opener according to claim 1, wherein the growing medium or mulch fiber comprises the wood and/or bark fiber dyed with natural and/or artificial pigments.

10. The fiber opener according to claim 1, wherein the compressed growing medium or mulch fiber is supplied in a bale with a density of 160 to 480 kg/m³.

11. The fiber opener according to claim 1, wherein at least two of the four sides of each projection have the same length.

12. A method of lowering density of a compressed growing medium or mulch fiber comprising:
supplying compressed or partially opened growing medium or mulch fiber to a fiber opener including at least one set of adjacent rotating members, each rotating member having a surface including at least one wire wound around at least a portion of the surface and ridges on the surface, the at least one wire secured on the surface of the rotating members by being set within the ridges, the at least one wire including a plurality of projections having a base portion gradually tapered to a top end on each side of the projection, the projections configured to open and expand compressed or partially opened growing medium or mulch fiber comprising wood and/or bark fiber; and
the adjacent rotating members being positioned relative to each other to provide at least one pinch point between the adjacent rotating members, the adjacent rotating members capable of separating fibers as input fiber passes through the at least one pinch point so that a density of passing fiber is lowered by at least 85%, relative to a density of the input fiber;
engaging the compressed or partially opened growing medium or mulch fiber with at least some of the plurality of projections;
expanding and opening the growing medium or mulch fiber by passing the compressed or partially opened growing medium or mulch fiber through the at least one pinch point;
separating the compressed or partially opened growing medium or mulch fiber into a plurality of strings of fiber in the at least one pinch point;
lowering the density of the growing medium or mulch fiber by at least 50-95%; and
discharging opened fiber.

13. The method according to claim 12, wherein the density of the opened fiber is 14.4 kg/m³ to 51.4 kg/m³.

14. The method according to claim 13, wherein the fiber of the compressed growing medium or mulch fiber is expanded in a ratio of at least 1:12.5 of unexpanded to expanded fiber.

15. The method according to claim 12, wherein the fiber of the compressed growing medium or mulch fiber is expanded in a ratio of at least 1:7.5 of unexpanded to expanded fiber.

16. The method according to claim 12, wherein the fiber of the compressed growing medium or mulch fiber is expanded in a ratio of at least 1:10 of unexpanded to expanded fiber.

17. The method according to claim 12, further comprising:
passing at least one bale of the compressed growing medium or mulch fiber through a bale breaker before supplying the growing medium or mulch fiber to the fiber opener;
engaging the at least one bale with the plurality of projections; and
creating partially opened fiber by separating the bale into pieces of fiber.

18. The method according to claim 12, further comprising:
supplying optional components including at least one of fertilizer(s), macronutrient(s), micronutrient(s), mineral(s), chemical binder(s), natural gum(s), and/or interlocking manmade fiber(s), soil, and/or seed to the opened fiber; and
mixing the opened fiber.

19. The method according to claim 12, further comprising a step of passing the opened fiber through an additional set of rotating members to further open the fiber.

20. A compressed growing medium opener comprising:
a set of adjacent rotating members, each rotating member having an arcuate surface including a plurality of depressions and a wire wound around at least a portion of the arcuate surface, the at least one wire including a plurality of projections, each of the projections having a base portion and four sides, the base portion tapering to a top end, the depressions and projections configured to open and expand compressed or partially opened growing medium or mulch fiber comprising wood and/or bark fiber; and
the adjacent rotating members being positioned relative to each other to provide at least one pinch point between the adjacent rotating members, the adjacent rotating members capable of separating fibers as input fiber passes through the at least one pinch point so that a density of passing fiber is lowered by at least 85%, relative to a density of the input fiber.

* * * * *